(12) United States Patent
Sipolins et al.

(10) Patent No.: US 12,501,103 B2
(45) Date of Patent: Dec. 16, 2025

(54) SUPPORTING CONTEXTUAL SUPPLEMENTAL CONTENT INTERACTIONS FOR STREAMERS BY MONITORING ENGAGEMENT

(71) Applicant: Adeia Guides Inc., San Jose, CA (US)

(72) Inventors: Aldis Sipolins, Somerville, MA (US); Serhad Doken, Bryn Mawr, PA (US); Cato Yang, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 114 days.

(21) Appl. No.: 18/590,296

(22) Filed: Feb. 28, 2024

(65) Prior Publication Data
US 2025/0274630 A1    Aug. 28, 2025

(51) Int. Cl.
*H04N 21/431* (2011.01)
*H04N 21/2187* (2011.01)
*H04N 21/4788* (2011.01)

(52) U.S. Cl.
CPC ..... *H04N 21/4316* (2013.01); *H04N 21/2187* (2013.01); *H04N 21/4788* (2013.01)

(58) Field of Classification Search
CPC ........... H04N 21/4316; H04N 21/2187; H04N 21/4788
See application file for complete search history.

(56) References Cited

U.S. PATENT DOCUMENTS

| 11,800,202 B2 * | 10/2023 | Marten | G06F 40/279 |
| 2017/0171121 A1 * | 6/2017 | Zhang | H04L 67/75 |
| 2020/0036831 A1 * | 1/2020 | Kim | H04M 1/7243 |
| 2025/0014606 A1 * | 1/2025 | Wong | G11B 27/031 |

OTHER PUBLICATIONS

Brian Dean, "Twitch Usage and Growth Statistics: How Many People Use Twitch?", (https://backlinko.com/twitch-users), (Jan. 30, 2024), (8 pages).

Google Ads Help, "Contextual targeting", (https://support.google.com/google-ads/answer/1726458?hl=en), (5 pages).

(Continued)

*Primary Examiner* — Oschta I Montoya
(74) *Attorney, Agent, or Firm* — HALEY GUILIANO LLP

(57) ABSTRACT

Systems and methods are described for monitoring chat activity in a live streaming session and automatically presenting prompts that include information of a supplemental content item that is related to the topic of the chat for presentation during the streaming session. The system receives and analyzes a chat message to determine its topic(s). A determination is made whether the topic is prominent and if a supplemental content item that is supported by the presenter relates to the topic of the chat. Upon a positive determination, a prompt is dynamically populated and displayed to the presenter. The presenter may verbally present the content of the prompt, or the supplemental content item may be displayed in other formats, during the streaming session. Presentation metrics and user engagement metrics may be obtained and provided to the supplemental content item provider.

20 Claims, 13 Drawing Sheets

(56) References Cited

OTHER PUBLICATIONS

Lexalytics, "Context Analysis in NLP: Why It's Valuable and How It's Done", (https://www.lexalytics.com/blog/context-analysis-nlp/), (6 pages).
Similarweb, "Top Websites Ranking", (https://www.similarweb.com/top-websites/), (3 pages).
Tetsuya Nasukawa, et al., "Sentiment analysis: capturing favorability using natural language processing", (K-CAP '03: Proceedings of the 2nd international conference on Knowledge), (Oct. 2003 pp. 70-77), (https://doi.org/10.1145/945645.945658).
The Weather Company, "What is contextual advertising" (https://www.weathercompany.com/blog/what-is-contextual-advertising-everything-you-need-to-know/), (5 pages).
Turing, "A Guide on Word Embeddings in NLP", (https://www.turing.com/kb/guide-on-word-embeddings-in-nlp), (8 pages).
Zihan Zhang, "Clustering Contextual Embeddings for Topic Modelling", (Towards Data Science), (May 20, 2022), (https://towardsdatascience.com/clustering-contextual-embeddings-for-topic-model-1fb15c45b1bd), (8 pages).

\* cited by examiner

SUPPORTING CONTEXTUAL SUPPLEMENTAL CONTENT INTERACTIONS FOR STREAMERS BY MONITORING ENGAGEMENT

FIELD OF DISCLOSURE

Embodiments of the present disclosure relate to monitoring engagement or interactions (e.g., chat activity) in a live streaming session, during which a presenter device provides content that is transmitted to recipient or participant devices connected to the live streaming session. Based at least in part on the monitoring of the live streaming session, and to help enhance engagement, a prompt may be generated that includes supplemental content suggestions for placement or inclusion within the live streaming session.

BACKGROUND

Streaming is a form of media in which a streamer or a presenter shares live video of what they are doing, typically alongside webcam footage and a live chat for users. To engage their audience, presenters often resort to making the presentation interactive, responding to the audience's questions, and commenting on what is posted by participants. The presenters also engage their audience by advertising on their streaming channels, such as with static ad banners or per-click type of advertising.

Although some of these engagement techniques are useful, they still have several drawbacks and leave ample room for increased engagement. For example, some chat sessions include hundreds of participants that post chat messages during the chat session. As more chat messages are posted, the chat feed continues to scroll at a fast pace and the presenter may miss some of the posted messages. Keeping up with the fast pace, especially when tens or hundreds of chat messages are posted within seconds or microseconds of each other, is not only challenging but practically not possible. Even more challenging is the presenter trying to address the questions or topics mentioned in each of the hundreds of posts. Since one of the goals of a presenter is to engage their audience, it becomes cumbersome and challenging to engage the audience in such live stream environment when a presenter cannot keep up with the pace of the messages being posted.

Another drawback with the current engagement techniques is that a chat message posted by a participant of the live stream session may get buried in other chats posted. It may also scroll outside the chat space due to the volume of chats posted. Not being able to address a chat due to the chat message getting buried our scrolling outside the chat space results in lost opportunities for engaging the participant.

As such, there is a need for a system and method for managing a live stream session, monitoring the participant interactions, and engaging them in real time, determining engagement opportunities and creating, positioning, and inserting interactive engagement elements.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
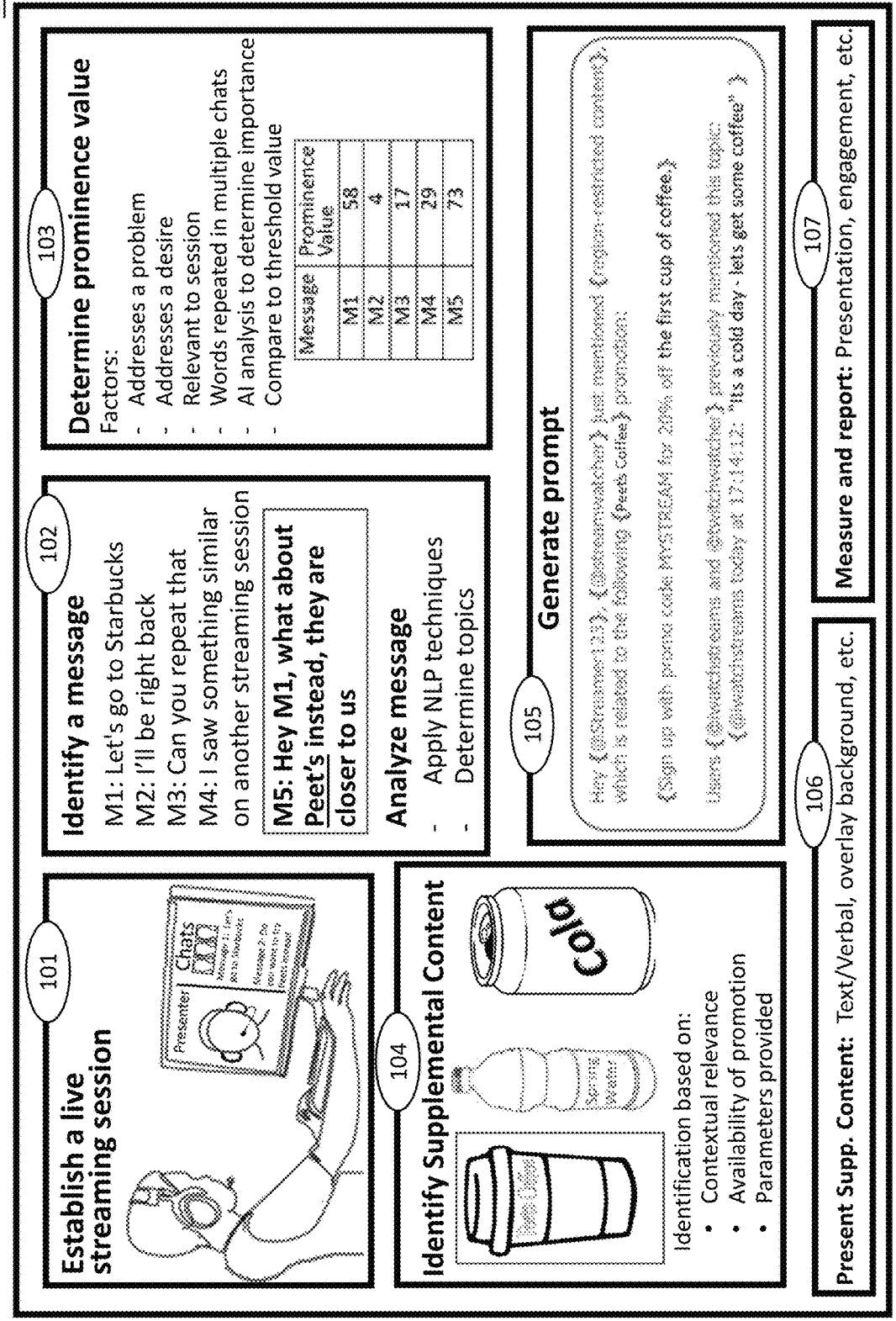
FIG. 1 is a block diagram of a process for analyzing chat messages and generating prompts for displaying, within a live streaming session, a supplemental content item(s) that is contextually relevant to the analyzed chat messages, in accordance with some embodiments of the disclosure.

In accordance with some embodiments disclosed herein, some of the above-mentioned limitations are overcome by analyzing a posting, such as a chat message, a group of chat messages, audio message, video message, or other forms of user engagement with the streamer/presenter, in a streaming session to determine the topic of the posting. The topic may be analyzed to determine its importance level and whether the importance level exceeds a predetermined importance threshold. If the topic's importance level exceeds an importance threshold, then a supplemental content item that is contextually related to the determined topic may be identified. A prompt that includes information relating to the supplemental content item may then be displayed on a user interface of the streamer for the streamer to present information provided in the prompt within the streaming session.

Since one of the goals of a streamer, also referred to as the presenter, is to engage their audience, the streamer (or the system, such as the system of FIG. 2) may implement tools and features in the streamer's user interface that may be used to increase engagement with the audience. These tools and features may allow real-time engagement of the participants with the supplemental content items presented by the streamer. They may also allow monitoring of the participant interactions, identifying of chat topics, evaluating relevancy of identified topics, determining engagement opportunities in real time, selecting an effective engagement opportunity, determining how to engage and when, providing feedback on the engagement, giving proper attribution to partners (as needed), and creating, positioning, and inserting interactive elements to increase engagement. In yet other embodiments, a chat session may be very active and busy where numerous chats are posted by several users, such as tens or hundreds of chats within a few seconds. The user interface area (or window) in which such chat is presented may be automatically scrolled at a fast pace to display the most current chat at the top of the window. As such, several chats may have been automatically scrolled to the bottom of the window and in some case may no longer appear in the window to keep up with the chat activity. In such scenarios, it may be hard to keep up with a fast scrolling chat window let alone determine the content and context of each chat. The embodiments described herein provide technical solutions that address a fast scrolling chat such that topics and engagement opportunities are not missed.

In some embodiments, a live streaming session between a presenter device and a plurality of participant devices is established. The presenter device is associated with a user who is the presenter (also referred to as the streamer) in the streaming session, such as the person who leads a discussion or provides a 1-way stream or video blog. The plurality of devices, which are associated with a plurality of users (also referred to as participants), are communicatively connected into the streaming session. The streaming session uses a streaming platform, which allows the presenter, via the presenter device, to present content. The streaming platform also allows the plurality of participants of the streaming session to enter chat messages within a chat box associated with the streaming session. The presentation of content and the chat messages allow the presenter and the participants to actively engage with each other in the streaming session.

In some embodiments, a streaming session may include a plurality of participant devices that are logged into the live streaming session. A chat message from a participant device, from the plurality of participant devices, may be entered in a chat box associated with the streaming session. The chat message may be posted to the streaming platform, i.e., within the live streaming session, for everyone on the streaming platform that is logged in to the live streaming session to see. In some embodiments, the chat message may be screened for content prior to it being posted on the streaming platform for everyone on the platform to see. In other embodiments, the chat message may also be screened for content after it has posted on the streaming platform and flagged or deleted for any inappropriate content.

In some embodiments, a topic of the chat message may be determined. The chat message may be associated with one or more topics. In some embodiments, the topics may be ranked according to their relevance to the chat message, and the highest-ranked topic may be used for subsequent processing, e.g., identifying a supplemental content item that is relevant to the determined topic.

In some embodiments, once a chat message is posted, its prominence value may be determined. As discussed herein, prominence refers to the relevance and/or importance of the chat message to the streaming session. Also as referred to herein, prominence value is an indicator of how actively participants are discussing the topic of the chat message. Prominence also applies to topics, e.g., topics of conversations that are associated with the chat messages. Accordingly, in embodiments disclosed herein, prominence refers to the relevance and/or importance of the topic of conversation associated with a plurality of chat messages and relation to the streaming session. The topic of the conversation may be determined by analyzing a plurality of chat messages, such as by utilizing NLP and AI techniques, to determine what is the topic or topics of discussion occurring in the chat. As such, prominence value is an indicator of how actively participants are discussing the topic in the chat. Likewise, relevance and/or importance of the chat message of plurality of chat messages to the streaming session may be determined by analyzing the content being presented by the streamer and determining relevance of the chat message(s) to the content being presented, e.g., if content being presented relates to sports, and the chat message(s) also relate to sports, then a determination may be made that the chat message is relevant and/or important to the streaming session and accordingly the prominence value may be an indicator of how actively participants are discussing the content presented in the streaming session as well as the degree of relevance and importance. For sake of simplicity and explanation, although references will be made to determining a prominence value of a chat message, the same principles may also be applied to determining a prominence value of topic(s) associated with a plurality of chat messages, and using that prominence value (i.e., of the topic) to identify and select supplemental content items.

The prominence value may be a score that is calculated based on the relevance of the chat message or the topic of the chat message to the factors discussed herein. The calculation may include assigning a weighted score to each of the factors and then either taking an average, mean, standard deviation, or use some other formula to calculate the prominence value/score.

Referring back to determining prominence value, once a prominence value of a chat message(s) is determined, a determination is made whether the prominence value exceeds a predetermined prominence threshold. If a determination is made that the prominence value of the chat message(s) exceeds a predetermined prominence threshold, then a matching supplemental content item from the presenter's supplemental content item list that matches the chat message, or the topic of the chat messages may be determined. In this embodiment, the matching step may be performed subsequent to determining the prominence value of the chat message, or the topic of the chat messages, and the matching step may be performed only if the prominence value exceeds a predetermined prominence threshold. In other embodiments, once a chat message is posted, or a topic is determined based on a group of chat messages, instead of first determining the prominence value of the chat message or the topic of the chat messages, and then determining a match with a supplemental content item that matches the topic, a match may be determined first, and only if a match exists may the prominence value of the chat message or the topic then be determined.

In some embodiments, the prominence value of the chat message (of the topic associated with a plurality of chat messages) may be determined based on a plurality of factors. In one embodiment, these factors may include determining whether the topic of conversation in the chat addresses a problem, addresses a desire, is related to the topic being presented in the streaming session, or is a topic that is currently trending on social media. The factors for determining prominence value of the topic may also include determining whether the topic of the chat message or keywords of the chat message match keywords or topics listed in a presenter or participant's parameters. If they do, then the topic is deemed relevant and such data is used in calculating the prominence value for the topic. In another embodiment, prominence factors include how often and how recently participants are talking about the topic of discussion, and how much reach those people have. To determine how much reach they have, metrics such as number of followers on social media and other engagement data with the followers may be considered. For example, if several followers typically like or comment on a topic, or a post by a follower that includes the topic, then such likes and comments may be associated with user interest in the topic and as such the prominence value of the topic may be increased.

As described earlier, the prominence value may be associated with a chat message or a topic of the chat messages, i.e., where a topic is determined based on a plurality of chat messages and the content of the chat messages. When prominence value is associated with a topic, subsequent chat messages received may influence the topic's prominence score. For example, if subsequent message continues to discuss the same topic, then the prominence score of the topic may be increased. However, if the subsequent message changes the topic, then the prominence score of the topic may be decreased.

Referring back to prominence as it relates to a chat message (which equally applies to a topic), once a determination is made that the chat message (or the topic) is prominent, then a search within the participant's list of endorsed and sponsored supplemental content items may be made. A supplemental content item that is relevant to the determined topic of the chat message may be identified. For example, if the chat message, a group of chat messages, or a topic of conversation in the chat message relates to coffee, and a coffee-related product or service is endorsed, sponsored, or subscribed to by the presenter, then a coffee-related product or service may be identified as the supplemental content item that is to be presented to the participant.

As described earlier, in some embodiments, the prominence value may be determined first, and if the chat message is determined to be prominent, such as based on exceeding a predetermined threshold, only then may a matching supplemental content item be determined. In other embodiments, whether there is a matching supplemental content item may be determined first, and if a matching supplemental content item is identified, only then may the prominence value be determined. Regardless of the order, once a supplemental content item has been identified, the system, such as the system in FIG. 2, may automatically display a prompt on a user interface of the presenter device for presenting the supplemental content item within the live streaming session.

The prompt may be dynamically populated and include information relating to the identified supplemental content item. The prompt may also include a script of what the presenter is to say during the live streaming session to accurately present the supplemental content item. Instead of a script, the prompt may also provide information relating to the supplemental content item that the presenter can use in presenting to the participants of the streaming session. The prompt may be displayed on the presenter's user interface while the relevant chat is still visible in the streaming session. A timer may also be displayed within which information in the prompt is to be presented. In this embodiment, the presenter may apply their own skill and style in determining what is the best way to present the supplemental content item such that it is both engaging and attractive to the participants of the streaming session. The prompt may also include a promotion or discount code that the presenter may present to the participants of the streaming session for them to purchase the supplemental content item, such as a product or service. The participants of the streaming session may, in some embodiments, avail themselves of the discount code by selecting it during the live streaming session. In some embodiments, the discount code may include an expiration period after which it may no longer be valid.

In some embodiments, the prompt may be displayed at a location in the presenter's user interface where the presenter's gaze is currently directed. Displaying the prompt at the same location may make it convenient for the presenter to gaze at the prompt and not have to switch their gaze from their current location of their gaze. In some embodiments, the prompt may be displayed while the relevant chat message based on which the prompt was generated is still displayed within the streaming session.

Various presentation formats may be utilized in presenting the supplemental content item. In one embodiment, the presentation format may be verbal (oral). Using this format, the presenter may verbally present the supplemental content item and information related to the supplemental content item to the participants of the streaming session. When a verbal format is used, a prompt, as described earlier, may be dynamically populated and presented to the presenter. The prompt may be a notification that includes a script to prompt the presenter to verbally act on a content suggestion opportunity in real time, and within the flow of the live streaming session. The script may be generated using a template or specified criteria, and may include additional content (e.g., a promo or discount code that can be automatically inserted into the chat message and/or saved elsewhere, such as a social media page or separate promo page, or a link to a product/service page, which may automatically apply a mentioned discount). The prompt may also include other actionable options for the presenter, such as an option to add a virtual object or animation into the live streaming session.

In other embodiments, the presentation formats may include overlaying the supplemental content item on an object that is in a background of the presenter. In this embodiment, the field of view of a camera of the presenter device may be determined. This field of view may be visible to the participants of the streaming session. An object in the field of view may be selected, and the supplemental content item may be overlayed on the selected object. Other formats of presentation are described in relation to FIG. 12.

Once a presentation is made by the presenter to the participants, the quality of the presentation, the performance of the presenter in presenting the supplemental content item, and the audience engagement metrics may be determined. These metrics may be forwarded to the supplemental content item provider such that they may determine the effectiveness of their supplemental content item, and how the presenter has performed in engaging the streaming audience.

Figure 2:
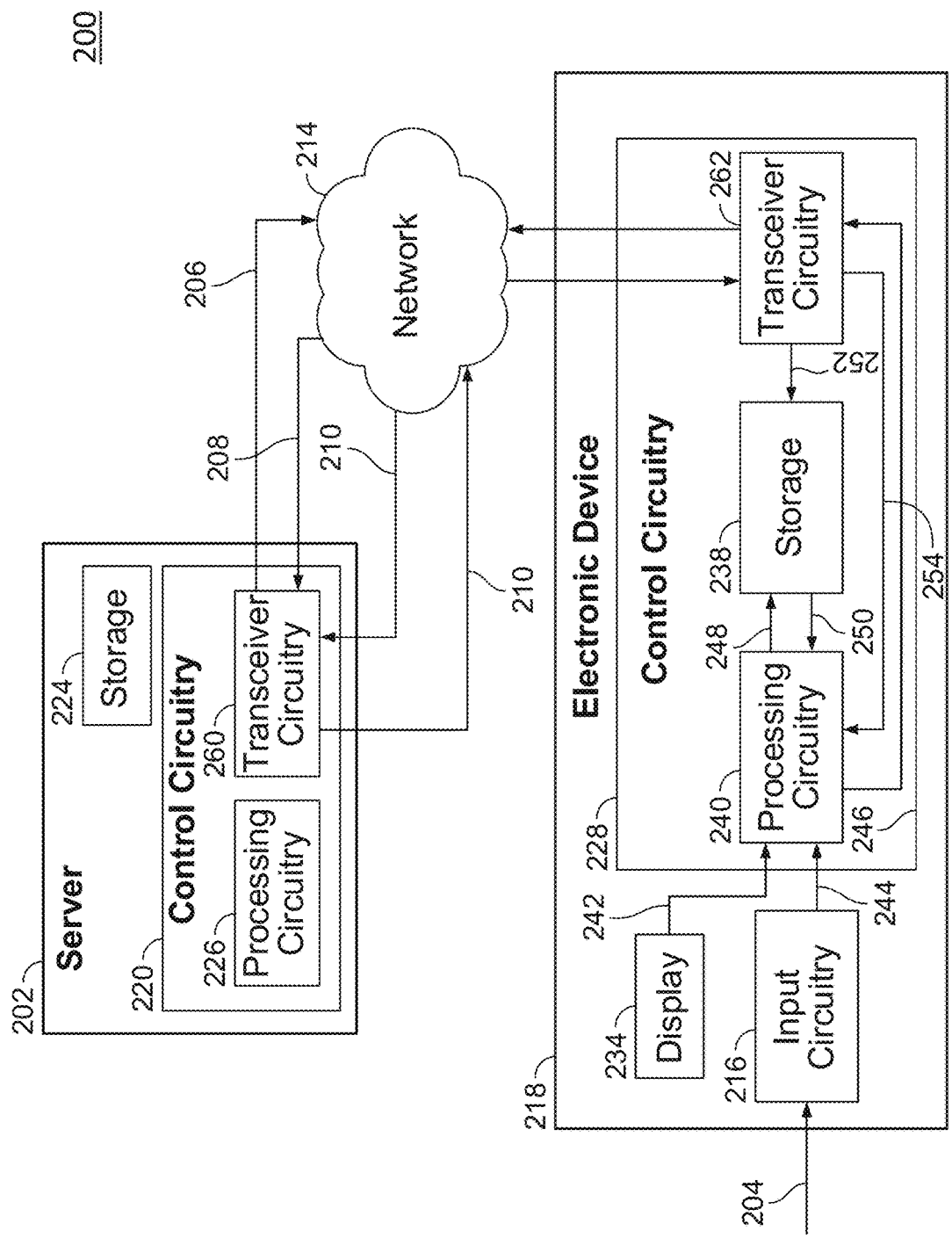
FIG. 2 is a block diagram of an example system for analyzing chat messages and generating prompts for displaying, within a live streaming session, a supplemental content item(s) that is contextually relevant to the analyzed chat messages, in accordance with some embodiments of the disclosure.
Figure 3:
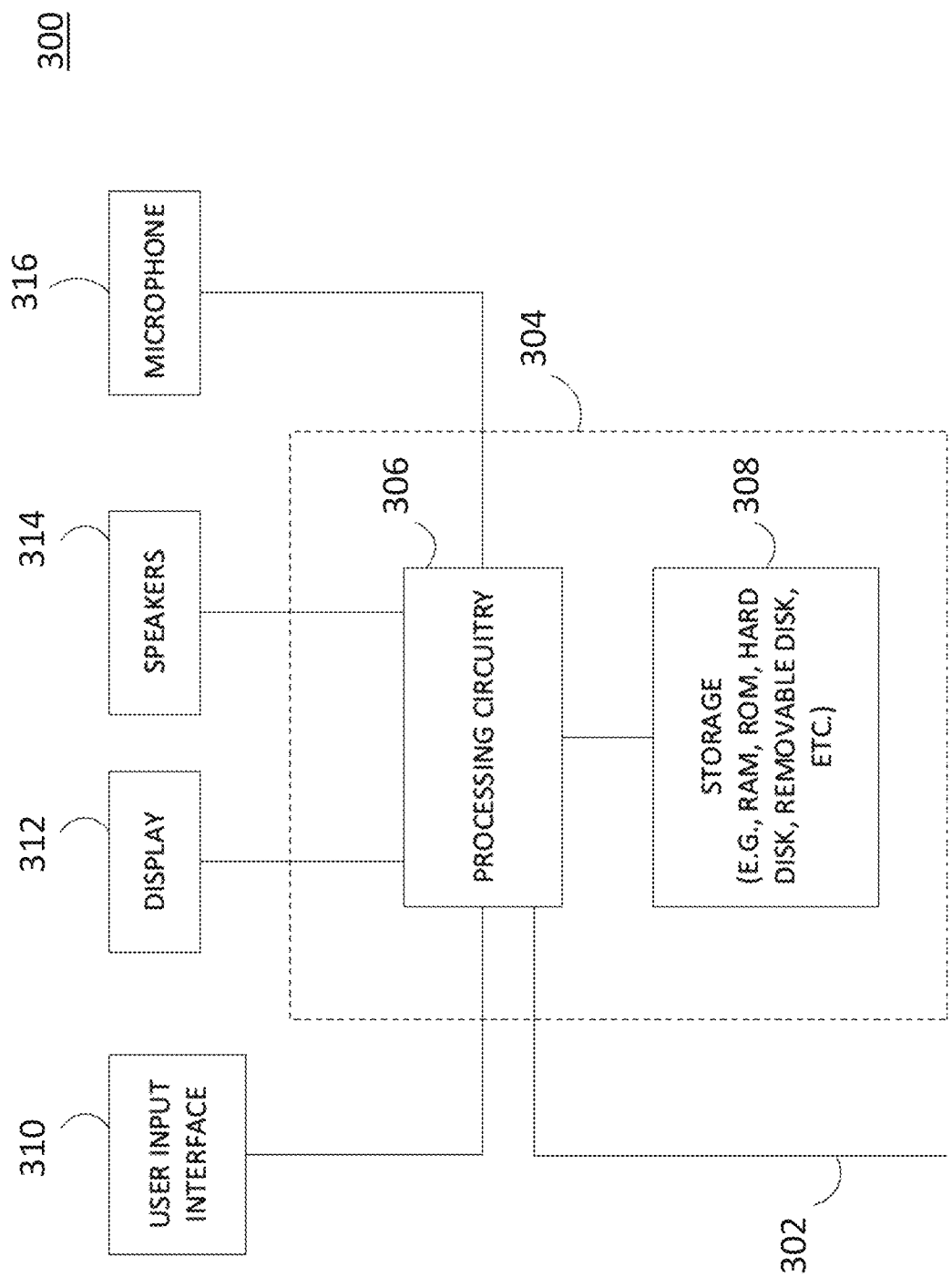
FIG. 3 is a block diagram of presenter device and its components used for live streaming during a live streaming session, in accordance with some embodiments of the disclosure.

The description below references various figures. FIGS. 1, 4-5, 11, and 14 depict example methods or processes that may be implemented. FIGS. 6-10 and 12-13 depict example entities described herein, such as example systems, devices, workstation setups for a presenter, types of prompts used, and types of display formats for displaying supplemental content items. Finally, FIGS. 2-3 depict example systems for implementing the disclosed techniques. Turning to the figures, FIG. 1 is a block diagram of a process for analyzing chat messages and generating prompts for displaying, within a live streaming session, a supplemental content item(s) that is contextually relevant to the analyzed chat messages, in accordance with some embodiments of the disclosure. The process 100 may be implemented, in whole or in part, by systems or devices such as those shown in FIGS. 2-3. One or more actions of the process 100 may be incorporated into or combined with one or more actions of any other process or embodiments described herein. The process 100 may be saved to a memory or storage (e.g., any one of those depicted in FIGS. 2-3) as one or more instructions or routines that may be executed by a corresponding device or system to implement the method 100.

In some embodiments, at block 101, a live streaming session is established. The live streaming session allows streaming of content, such as videos, video games, music, radio shows, or podcasts, to multiple users. It is similar to broadcasting to several viewers, in some instances thousands or hundreds of thousands of viewers, from one or more presenters. Some popular live streaming platforms include Kick™, YouTube Live™, Facebook Live™ or Trovo™, Vimeo Livestream™, Periscope, and Video Tab™.

In some embodiments, by establishing the live stream session at block 101, users, also referred to herein as participants, are able to interact with the presenter and each other via a chat feature. This chat feature may be a live chat feature that posts all chat messages posted by the presenter or the participants within the live streaming session. In some embodiments, the posts in the chat may be screened, such as for inappropriate language, nudity, hate words, etc., before the chat messages entered into the chat box by participants are posted onto the streaming platform. In other embodiment, the chat message may be screened before or after it has been posted by the participant and removed if it is flagged for inappropriate language, nudity, hate words, etc. In yet other embodiments, if the chat message is flagged, such as for language, depending on the severity of language, e.g., level of inappropriateness, the prominence value of the flagged chat message may be proportionally decreased. In some embodiments, a user's comment history or profile may prevent their message from appearing in the chat or reduce the prominence of their messages if it violates streamer-provided or partner-provided parameters against such content.

As depicted in block 101, the presenter device, which is a device used by the presenter, may include a user interface having a plurality of sections. The presenter device may be a laptop, smart TV, mobile phone, or any other electronic device that is capable of connecting to the internet to provide a live streaming session and able to provide a live chat exchange between the presenter and the participants. The presenter device may also be a plug-in for a social media streaming service such as Twitch™.

The presenter device may display a presenter user interface (UI) that may be used by the presenter for streaming the live streaming session. The presenter UI may include a plurality of sections. These sections may include a section that is designated for displaying posted chat messages, a section that displays the content being presented by the presenter, a section for an image of the presenter, and a section that either displays the participant's live video or their avatar or icon. Although some sections of the UI have been described, the sections of the UI are not so limited, and any less or more sections are also contemplated. Since one of the goals of a streamer, also referred to as the presenter, is to engage their audience, the streamer (or the system, such as the system of FIG. 2) may implement other features in their UI that may increase engagement with the audience. As will be described further in more detail, one such feature is the ability to display prompts to the presenter and display supplemental content items to the audience.

At block 102, once the presenter starts the streaming session, participants of the streaming session, using participant devices, may enter a chat message within the streaming session. The presenter may start the streaming session by logging in to the streaming platform that provides the presenter UI. When the presenter starts the streaming session, the control circuitry 200 and/or 228 of the system, such as the system in FIG. 2, may establish a streaming session that allows the presenter device to connect to a plurality of participant devices. The participants may then enter a chat message in a chat box or some other area on the UI displayed on the participant device. In some embodiments, the entered chat message may automatically and in real time be posted on the streaming platform. In other embodiments, the entered chat message may be screened and approved for posting before it is posted to the streaming platform. In yet other embodiments, the entered chat message may be screened after it has been posted and flagged if it violates and platform policies or policies set by the streamer.

In some embodiments, the control circuitry 200 and/or 228 or 304 or processing circuitry 226, 240 or 306 shown in FIGS. 2-3 may receive the inputted text chat messages at block 102. As depicted, participants M1-M4 have entered a chat message in their chat box, which may be displayed on the streaming platform. For example, participant M1 may have entered a message "Let's go to Starbucks," participant M2 may have entered a message "I'll be right back," participant M3 may have entered a chat message "Can you repeat that," participant M4 may have entered a chat message "I saw something similar on another streaming session, and participant M5 may have entered a chat message "Hey M1, what about Peet's instead, they are closer to us."

The control circuitry 200 and/or 228 or 304 or processing circuitry 226, 240 or 306 shown in FIGS. 2-3 may then analyze the chat message using natural language processing (NLP) techniques to extract relevant parameters. These parameters may include, for instance, identified topics (e.g., endorsed goods/services, partners/sponsors), sentiment/tone of the message, and other streamer-provided and partner-provided parameters. Once relevant parameters have been extracted from the chat message, they may be compared to streamer-provided and partner-provided parameters to identify any relevant endorsed goods/services (e.g., supplemental content items).

In some embodiments, the control circuitry 200 and/or 228 may determine the prominence value of the chat message at block 103 from the extracted parameters. As discussed earlier, prominence refers to the relevance and/or importance of the chat message or the topic of the chat message to the streaming session. Also as referred to herein, prominence value is an indicator of how actively participants are discussing the topic in the chat. Prominence value degrades over time, and streamers or sponsors may indicate different rates of prominence value degradation for different topics. The contribution of a chat message to a topic's prominence value depends on features of the participant's profile. For example, a participant may have a large following on social media or may have a long history of using the streaming platform. If such a participant posts a chat message (or a group of chat messages) it may have a strong impact on a mentioned topic's prominence value. In contrast, a new participant with much less following may not have as much impact. A variety of scales may be used for prominence values, such as a scale of 1-10, 1-100, A-Z, or a scale of low, medium, or high. A chat message's prominence value may be compared to the scale to determine whether the chat message ranks in a higher or lower prominence value tier.

If the chat message is determined to be prominent (i.e., it has a prominence value above a threshold value), then it would be associated with being relevant and important in the streaming session. In some embodiments, the threshold value may be predetermined and set by the presenter of the streaming session. In other embodiments, the threshold value may be predetermined and set by the system, such as the system depicted in FIG. 2. Once the chat message is determined to be prominent, i.e., exceeding the predetermined threshold value, then the parameters may be used to identify content suggestion opportunities in the live, real-time streaming context. In other words, in some embodiments, content suggestion opportunities are identified only when the chat message is determined to be prominent and not identified when the chat message is not determined to be prominent.

Some factors that may be used to determine whether a chat message is prominent may include, in some embodiments, whether the chat message addresses a problem (which may be the topic of the presenter's presentation). For example, the presenter of the streaming session may be discussing a specific problem, such as a problem relating to climate change. The content of the chat message posted by a participant may relate to climate change. As such, the control circuitry may determine that the chat message addresses the problem being discussed, i.e., climate change, and accordingly may determine that the chat message is relevant to the streaming session. The control circuitry 200 and/or 228 may also rank the chat message based on its degree of relevance in addressing the problem. For example, although the chat message may relate to climate change, a message that states, "I was cold last night," may not be relevant to addressing the problem. On the other hand, a message that states, "We need to prepare for this winter as it may be much colder than last winter due to weather patterns," may be considered to be more relevant and addressing the problem of climate change and as such may address the problem to a higher degree. The control circuitry 200 and/or 228 may calculate the prominence value in this embodiment based on whether the message addresses the problem and if so, the degree to which it addresses the problem.

In some embodiments, another factor that may be used to determine whether a chat message is prominent may include determining whether the message addresses a desire or articulated intent. For example, as depicted in block 102, participant M1 inputs a message desiring to go to Starbucks™ (presumably for coffee). Later in the streaming session, participant M5 directly responds to the same desire of getting coffee but suggests a different vendor, i.e., Peet's™. Accordingly, the control circuitry 200 and/or 228 may determine that the chat message by M5 is contextually relevant to the chat message by M1, both of which express a desire to get coffee. The control circuitry 200 and/or 228 may then calculate a prominence value for one or both messages based on the degree to which the two separate chat messages address each other's desires.

In another embodiment, relevance of the message to the streaming session may be used as a factor to gauge its prominence. For example, when the presenter is presenting a topic, and participant M4 states that they saw something similar on another streaming session, that message may be directly related to the topic of the session. For such a chat message, the control circuitry 200 and/or 228 may determine its contribution to the topic's prominence value is relatively high. In another example, the presenter may indicate that they will be taking a 20 minute coffee break and that they will be getting some Peet's coffee during that break. Such a comment and timing may make the message relevant to the streaming session as that provides an opportunity for other participants to also get coffee during the upcoming break and think about a promotion that the presenter may offer, such as a Peet's coffee coupon.

In yet another embodiment, if words are repeated in a chat session, such as by the same participant or multiple participants, such repetition of words may be used as a factor to determine the message's prominence value. For example, the control circuitry may determine that a word associated with a product, company, or genre may be repeated within a streaming session. If the word is repeated more than once, or more than a predetermined threshold number of times, then the control circuitry may determine that the word or phrase is prominent. In some embodiments, the prominence value may increase proportional to the number of repetitions. For example, if one participant, or multiple participants, during the streaming session enters a message and a word in the message is repeated, such as coffee, then the message may be considered to have a high prominence value based on the word being repeated multiple times. In some embodiments, the control circuitry may monitor for repeated words within the same streaming session. In other embodiments, the control circuitry may monitor for repeated words across multiple streaming sessions that may be presented by the same presenter. For example, the same presenter may present on the topic of health across various streaming sessions. From each separate streaming session, the word "exercise" or the word "protein" may be repeated. As such, the control circuitry may determine that any message that includes the words "exercise" or "protein" is prominent.

In some embodiments, a prominence value may be modified. For example, a determined prominence value may be boosted based on its being discussed previously in the same or other streaming sessions by the same presenter. For example, if a similar message having the same topic was posted previously, then the message is likely important and relevant to the session. As such, the control circuitry may boost the prominence value already determined for the chat message since it was discussed previously.

Other boosters of prominence value may include features of a user's profile such as activity, previous engagement, and followers on linked social media accounts. For example, if the participant's profile includes certain words of importance, such as keywords, then, when the participant inputs a message that includes a word that matches one of their profile keywords, the control circuitry may determine such a message to have a high prominence value. In this embodiment, the control circuitry may access the profile of the participant who is inputting a chat message and compare the words in the chat message to the words in the profile to determine a match.

Some examples of prominence values calculated by the control circuitry for detected topics in block 102 are depicted in the table in block 103 (addresses a problem, relevant to session, word repeated in multiple chats, etc.). For example, the message posted by M2, i.e., "I'll be right back" would have no contribution to any topic's predominance values based on any of the factors analyzed (e.g., the context of the chat message or its keywords do not match the topic of discussion in the chat session, or the topic presented by the presenter of the streaming session). In another example, since chat messages by M1 and M5 are contextually relevant to each other's postings, i.e., they both relate to getting coffee, they may receive higher prominence scores based on any of the factors analyzed (e.g., the context of the chat message or its keywords to the topic of discussion in the chat session, or the topic presented by the presenter of the streaming session).

For example, a weighted score may be determined based on relevance of the chat message or topic of the chat messages to the plurality of factors. In some embodiments, a predetermined weighted value may be assigned, e.g., if the topic is directly relevant to the topic of the streaming session, a score of 10 (on a scale of 1-10) may be assigned.

In some embodiments, the control circuitry 200 and/or 228 determines whether the words in the posted chat message, or the topic of the posted chat message, relate to a supplemental content item that the presenter is endorsing, promoting, or sponsoring. As used herein, a supplemental content item may be any product or service that the presenter is endorsing, promoting, or sponsoring. The supplemental content item, for example, may be provided to the presenter by a provider based on an agreement between the presenter and the provider, such as a sales agreement, employment agreement, or advertising agreement. In some embodiments, if a determination is made that the words in the posted chat message, or the topic of the posted chat message, relate to a supplemental content item that the presenter is endorsing, promoting, or sponsoring, the circuitry 200 and/or 228 may then proceed to the steps of updating the detected topic's prominence value. For example, in some embodiments, the control circuitry 200 and/or 228 may determine that "Peet's," which is a coffee shop, is being sponsored by the presenter. Thus, when the chat message includes the name of the sponsored entity, i.e., Peet's, such as in the message posted by M5 in block 102, the control circuitry 200 and/or 228 may proceed to calculate the prominence value of such a message. To determine whether the content and context of the chat message relate to a supplemental content item that the presenter is endorsing, promoting, or sponsoring, the control circuitry 200 and/or 228 may apply NLP techniques to the chat messages. The NLP techniques may be used to identify relevant topics being discussed via the one or more chat messages. Based on the topic determined, a determination may be made whether the topic matches anything in the presenter's list of sponsored offerings. If a match between the topic of the message and a sponsored offering is determined, then the prominence value may be calculated. The control circuitry may also apply filters to ensure that parameters (i.e., sentiment, user history, engagement) match the advertiser and streamer requirements before calculating the prominence value.

In other embodiments, if a determination is made that the words in the posted chat message, or the topic of the posted chat message, do not relate to a supplemental content item that is being endorsed, promoted, or sponsored by the presenter, then the control circuitry may not perform the prominence calculation of block 103. In such an instance, where the content or context of the chat message does not match any product or service endorsed, promoted, or sponsored by the presenter, the control circuitry 200 and/or 228 may continue to monitor chat messages until such a match is determined and then perform the calculations of prominence value as described in block 103.

At block 104, the control circuitry 200 and/or 228 may identify a supplemental content item that matches the words, topic, content, and/or context of the one or more chat messages posted within the streaming session. To determine a match, the control circuitry 200 and/or 228 may apply NLP techniques to the chat messages to determine the topic of discussion. The content of the topic may be used to determine a match with the presenter's list of sponsored offerings. For example, a determination may be made based on the text messages by M1 and M5 that the topic is getting together, getting coffee, or meeting for some beverage, such as a coffee. Based on such determination, the control circuitry 200 and/or 228 may identify a presenter's list of sponsored offerings that relate to the determined topic. For example, the control circuitry 200 and/or 228 may identify Peet's Coffee, Spring water, and Cola products that relate to the determine topic and are within the presenter's list of sponsored offerings.

The control circuitry 200 and/or 228 may also utilize artificial intelligence (AI) and machine learning (ML) engines and execute AI and ML algorithms to determine the best match based on the topic of the chat message. In some embodiments, since the topic of messages posted by M1 and M5 relates to coffee, the control circuitry 200 and/or 228 may identify Peet's Coffee as the best suitable match. The control circuitry 200 and/or 228 may also order the product offerings based on their match or relevance rank to the posted chat message, e.g., products that have a higher relevance may be shown on top and those with lesser relevance after the higher relevance products.

In some embodiments, the control circuitry 200 and/or 228 may determine both contextual relevance of the products and services in the presenter's list of sponsored offerings as well as selection factors for selecting the supplemental content item. These selection factors may include parental restrictions, genre, budget, location, user's wish list, and other restrictions that may be inputted by the user or determined by the system. For example, if the product selected for recommendation is a product that is beyond a budget set by a participant, then the product may not be recommended to the presenter/streamer in a prompt for displaying within the streaming session. Some examples of selection factors and further details are described in relation to FIG. 8.

At block 105, a prompt may be displayed to the user interface of the presenter device. As described earlier, various processes may be performed before a prompt is generated for the presenter, and such processes may include determining whether a chat message or a topic associated with chat messages (i.e., a topic of conversation) is sufficiently prominent, i.e., exceeds a prominence value above a predetermined threshold, which may be based on determining whether a chat message(s), with specificity, relates to relevant subject matter of the streaming session.

Once the prominence value and/or the topic of the chat message(s) is determined to exceed the predetermined threshold value and a supplemental content item that is contextually relevant to the chat message(s) and/or the topic is identified, regardless of which order they are both determined, and any restrictions on selection of supplemental content items are addressed, the prompt may be presented on the presenter device. The prompt may include a script for the presenter associated with the presenter device to verbally present the identified supplemental content item from block 104 to the participants (audience) of the streaming session. The presenter may use their microphone and read the script or present an improvised version of the script to the participants.

The prompt may include, in some embodiments, the name of the participant or participants and the content of the chat message posted by the participant or participants. The prompt may also include the location of the participant. The location may be specific to a small region, such as a neighborhood in San Jose, or more generic, such as New York, Chicago, France, India, etc. The location may be obtained from the participant's GPS coordinates or their IP address. The prompt may also indicate which supplemental content item from the presenter's list contextually matches the posted chat message. For example, the prompt may indicate a single supplemental content item or multiple supplemental content items ranked in order of their relevance to the chat message. The prompt may also include a promotion, such as a discount code, associated with the supplemental content item. In some embodiments, the prompt may also include any prior mentions of either the same topic of the chat message or prior mention of the supplemental content item by other participants in the current or previous streaming sessions. In other embodiments, the prompt may include an explicit mention of attribution to a "partner" if the supplemental content relates to a sponsored item. The attribution can be part of the spoken script or inserted as a text or a hashtag. For example, if the partner is Peet's coffee, then the spoken script provided to the streamer within the prompt may include a specific mention to Peet's coffee. In yet other embodiments, options may be provided for inserting additional interactive elements in the chat box. For example, links may be provided in the prompt that when selected may allow the control circuitry to perform backend computational processes that would insert participant engaging interactive elements in the chat box. For example, such engaging elements may include presenting a game, quiz, question, or something that the participant can interact with to avail a promotion. Engaging elements may also provide the participant to comment on a supplemental content item or provide its review during the chat session to both engage the participant and have them avail an offer.

The prompt may be customized to include less or more of the information depicted in block 105. The prompt may be customized by the presenter or automatically by the system to display any other information that may be useful for the presenter in presenting the supplemental content item to the participants during the streaming session.

In some embodiments, a single prompt may be presented on the UI of the presenter device. In other embodiments, multiple prompts may be presented on the user interface of the presenter device, where each prompt is associated with a single topic discussed in one or more chat messages during the streaming session. So as to not overcrowd the user interface, the presenter or the system may also place a limit on the number of prompts that may be displayed simultaneously on the presenter device during the streaming session.

In some embodiments, the control circuitry 200 and/or 228 may determine a location on the user interface for placing the prompt. In one embodiment, the control circuitry 200 and/or 228 using a camera associated with the presenter device may monitor the gaze of the presenter. The control circuitry 200 and/or 228 may track the direction of a presenter's gaze and determine a location on the user interface to which the gaze is directed, such as center of the screen, to the left of the screen, etc. The control circuitry 200 and/or 228 may then display the prompt at the determined location of the user interface where the presenter's gaze is directed. By displaying the prompt where the presenter's gaze is already directed, the control circuitry 200 and/or 228 may make it convenient for the presenter such that the presenter may not have to look elsewhere or change their gaze in order to focus on the prompt displayed. Presenting the prompt where the presenter's gaze is already directed also provides a more natural feel from the participant's perspective.

At block 106, the supplemental content item may be presented to the participants. In some embodiments, the presentation may be in a verbal form. In other words, the presenter of the streaming session may verbally present the supplemental content item to the participants. In this embodiment, a script, such as the script in FIG. 9, may be provided in the prompt to the presenter for using as a guideline to present the supplemental content item to the participants during the streaming session. The script may be dynamically populated in the presenter's UI window and include information relating to, for example, the relevant partner advertisement and any relevant user information in a compact UI prompt. The script may further include names of participants to whom the verbal presentation of the promotion, discount codes, and any other relevant information may be directed. When the presenter verbally presents the supplemental content item, their presentation may be analyzed to determine if any further action is to be taken. For example, if the presenter states in their verbal presentation "I'll post the link or discount code to the chat," then the control circuitry may automatically take further action by posting the mentioned link. Likewise, the verbal presentation may be monitored for any other action item that is to be taken and such action item may be automatically performed alleviating the need for the presenter to follow through and perform the action.

In other embodiments, a prompt may be provided to the presenter, which may include options to insert text, codes, links, etc. into the chat window. The prompt may provide an option for the presenter to directly message one or more participants.

In yet other embodiments, a discount code associated with the supplemental content item or some basic information relating to the supplemental content item may be provided to the presenter, and the rest may be left up to the presenter to use their creativity in engaging their audience and presenting the supplemental content item. In other embodiments, the supplemental content item may be presented as a graphic, a background overlay, a filter, or a ticker at the bottom of the screen. Additional examples of formats used to present the supplemental content are described in further detail in relation to FIG. 12.

In some embodiments, in addition to presenting the supplemental content item, a computer-assisted function may include automatically inserting, or providing options to insert, text, image, video, and/or audio that identifies the relationship between the presenter and a mentioned product/service or related partner/sponsor associated with the supplemental content item presented. The inserted content would be close in time and/or space to the mention of the supplemental content item, and may include a suitable hashtag, e.g., #Partner name, #Name of supplemental content item, other text that indicates a relationship with a partner or sponsor, audio that states a partner relationship, an image/animation overlay that does the same, etc. This would help the streamer to help foster honest, transparent, and authentic interactions with participants, and to comply with guidelines or established practices relating to social media endorsements.

In some embodiments, once the supplemental content is presented, the control circuitry 200 and/or 228, at block 107, measures or analyzes the presentation of the supplemental content. The control circuitry 200 and/or 228 may also measure the user engagement by the participants of the streaming session after the supplemental content has been presented. The control circuitry 200 and/or 228 may then record the metrics of the presentation and participant engagement, and may report the metrics, such as to a provider of the supplemental content, or to a service or server that functions to manage the supplemental content. The metrics may be used to determine the effectiveness of the presentation, that is, whether the presenter was able to engage the audience with the supplemental content item, which may be a product marketed by the provider. In some embodiments, if the engagement is determined to be below a threshold level, the metrics related to the engagement may be used to provide additional information to the presenter, such as in a second prompt, for presentation.

With respect to presenter measurement, the control circuitry 200 and/or 228 may use a plurality of factors to measure how well the presenter presented the supplemental content to the participants of the streaming session. In some embodiments, the control circuitry 200 and/or 228 may score the presenter based on the plurality of factors. These factors may include pronunciation, sentiment, enthusiasm, accuracy, persuasiveness, eye contact, etc. Performance of the presenter/streamer with respect to pronunciation, sentiment, enthusiasm, accuracy, persuasiveness may be detected based on analyzing voice inputs and using an AI engine executing an AI algorithm. Performance related to eye contact and other visuals may be detected based on analyzing camera input of the presenter's gaze.

In some embodiments, when the content item is an advertisement for a product or service, the streamer/presenter may be presented with a dynamically populated UI prompt. The control circuitry 200 and/or 228 may then monitor the streamer's audio to determine if and when the streamer mentions the suggested ad topic. For example, a determination may be made whether the streamer mentioned the ad topic substantially in real time, while the topic is still present or relevant in the chat session, e.g., prior to the chat session moving on to another topic thereby making the streamer's mention of the ad too late. In the event the streamer is delayed in mentioning the ad, such as after the expiration of the timer in FIG. 9, or does not mention it at all, then such streamer performance may be reported, such as to a provider of the supplemental content item, to the streamer itself, or to a service or server that functions to manage the supplemental content.

In another embodiment, if the streamer presented the ad topic, the control circuitry 200 and/or 228 may analyze the streamer's sentiment while presenting the ad topic to determine whether the streamer accurately mentioned relevant features of the ad, how accurately they followed the UI prompt if a specific prompt is provided. The control circuitry 200 and/or 228 may also the quality of the streamer's interaction with the participants (e.g., eye contact, consistency with natural speech patterns). The control circuitry 200 and/or 228 may also analyze whether the primary subject matter or key points from the script have been stated or otherwise conveyed by the streamer. The control circuitry 200 and/or 228 may further analyze whether the presentation was provided within a given time frame (e.g., substantially real-time) or at least prior to the topic of the chat session changing to a different topic.

Such information may be compared by the control circuitry 200 and/or 228 to advertiser-provided parameters and provided to the advertiser, or even to the streamer, to evaluate the effectiveness of the ad campaign more exactly.

In some embodiments, the control circuitry 200 and/or 228 may also monitor back-and-forth text messages between participants, or between the presenter and the participants, to determine if any questions relating to the presented supplemental content item were properly answered by the presenter. For example, if a question relating to what ingredients are used by Peet's in a caramel macchiato coffee is asked by a participant, the control circuitry 200 and/or 228 may monitor the presenter's response to determine whether the presenter has accurately described the ingredients. In some embodiments, an artificial intelligence (AI) tool may provide suggested answers based on its access to databases at the content provider.

With respect to audience engagement, the control circuitry 200 and/or 228 may monitor chat messages after the presentation of the supplemental content item to determine whether the participants have engaged in the topic of the supplemental content item. For example, if the supplemental content item presented by the presenter is Peet's Coffee, then the control circuitry 200 and/or 228 may determine if the participants are discussing Peet's Coffee in follow-on chat messages.

In some embodiments, if a determination is made by the control circuitry 200 and/or 228 that the participants are discussing Peet's Coffee, the control circuitry 200 and/or 228 may continue to suggest additional supplemental content items that relate to Peet's Coffee to keep the audience engaged.

If a determination is made by the control circuitry 200 and/or 228 that the participants are not discussing Peet's Coffee, the control circuitry 200 and/or 228 may provide additional promotions, such as a deeper discount or discount on a separate product sold by the same company (Peet's), such as a tea, and present a follow-up prompt to the presenter for presenting in an attempt to engage the audience. The control circuitry 200 and/or 228 may also search for other supplemental content items from the presenter's list of sponsored offerings that are contextually related to the chat messages and populate a script to the presenter for the other supplemental content items. For example, if the presenter is also endorsed by Philz™ coffee, then the control circuitry 200 and/or 228 may populate a script to the presenter that includes a promotion of Philz Coffee after the initial presentation of Peet's Coffee does not gain any traction on the streaming session. As described earlier, the control circuitry 200 and/or 228 may rank the product offerings based on their prominence values based on the relevance to a posted chat message and may have multiple supplemental content items that may be relevant to a posted chat message. As such, the control circuitry 200 and/or 228 may select a next ranked supplemental content item if a presented supplemental content item does not get the desired engagement.

The control circuitry 200 and/or 228 may report presenter score, presenter details, audience engagement metrics, and any other information relevant to the supplemental content item to the provider of that supplemental content item. The control circuitry may also summarize the chat interaction related to the supplemental content item and provide the summary to the supplemental content item provider. The control circuitry 200 and/or 228 may also report to the provider the details relating to any questions asked regarding the supplemental content item and the answers provided. The provider may then choose to respond back to a query by providing another prompt to the presenter that directly addresses the query. For example, if the query by a participant asks, "What are the ingredients used by Peet's in a caramel macchiato coffee," the provider may dynamically populate the prompt with a script having the answer, and the presenter may verbally read the script provided in the prompt.

In some embodiments, a machine learning (ML) tool may monitor the presenter's presenting history and style and customize the prompts that are associated with the presenter's style. For example, if a presenter's style is professional, comedic, or casual, then the script would be dynamically populated in the presenter's style of speaking and conveying.

FIG. 2 is a block diagram of an example system for analyzing chat messages and generating prompts for displaying, within a live streaming session, a supplemental content item(s) that is contextually relevant to the analyzed chat messages, in accordance with some embodiments of the disclosure. FIGS. 2 and 3 also describe example devices, systems, servers, and related hardware that may be used to implement processes, functions, and functionalities described at least in relation to FIGS. 1, 4-14. Further, FIGS. 2 and 3 may also be used at least for establishing a live streaming between a presenter device and a plurality of participant devices, providing user interfaces on the presenter device and the plurality of participant devices that allow exchange of messages, such as chats, and other content, such as images, videos, etc., identifying chat messages(s), analyzing content and context associated with the chat messages, using NLP techniques to analyze the chat message(s), determining prominence value of the chat message(s), using a plurality of factors so determine the prominence values, including relevance to the streaming session, using AI tools and associated algorithms to analyze the relevance and importance of the chat message(s) in relation to the streaming session, identifying supplemental content item(s) that are relevant to the chat message(s), generating for display a prompt on a user interface of the presenter device for presenting the information provided in the prompt, determining a location on the user interface, based on the presenter's gaze, to display the prompt, including a variety of information in the prompt, including promotional information for a supplemental content item that may be relevant to the chat message(s), determining engagement of the participant devices based on the presentation of the information from the prompt, determining whether the information provided in the prompt was accurately presented by the presenter, reporting both engagement and accuracy metrics to the supplemental content provider or a sever, determining and reporting timing of the information presented, e.g., including whether it was presented within a timer provided, overlaying supplemental content items on objects in the presenter's background that are visible to the participant devices, and utilizing NLP, AI, and ML engines to execute associated algorithms for determining various solutions described herein, and performing functions related to all other processes and features described herein.

In some embodiments, one or more parts of, or the entirety of system 200, may be configured as a system implementing various features, processes, functionalities and components of FIGS. 1, and 4-14. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content (e.g., information relating to the presenter and participant devices, chat messages and other content posted within the streaming session, analysis results relating to the content and context of the chat messages, prominence value of the chat message(s), supplemental content item(s), prompt(s) and the information within the prompts, timing, accuracy, and engagement metrics associated with the presentation by the presenter, and AI and ML algorithms). Non-volatile memory may also be used (e.g., to launch a boot-up routine, launch an app, render an app, and other instructions). Cloud-based storage may be used to supplement storages 224, 238 or instead of storages 224, 238. In some embodiments, data relating to presenter and participant devices, chat messages and other content posted within the streaming session, analysis results relating to the content and context of the chat messages, prominence value of the chat message(s), supplemental content item(s), prompt(s) and the information within the prompts, timing, accuracy, and engagement metrics associated with the presentation by the presenter, AI and ML algorithms and data relating to all other processes and features described herein, may be recorded and stored in one or more of storages 212, 238.

In some embodiments, control circuitries 220 and/or 228 executes instructions for an application stored in memory (e.g., storage 224 and/or storage 238). Specifically, control circuitries 220 and/or 228 may be instructed by the application to perform the functions discussed herein. In some implementations, any action performed by control circuitries 220 and/or 228 may be based on instructions received from the application. For example, the application may be implemented as software or a set of executable instructions that may be stored in storage 224 and/or 238 and executed by control circuitries 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, the control circuitry 228, in response to determining that the prominence value of a chat message(s) is above a threshold, automatically populate a prompt and generate it for display on the presenter device which includes promotional information relating to a supplemental content item that is relevant to the chat message(s). The control circuitry 228 may also perform steps of processes described in FIGS. 1, 4-14.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as prominence values of chat message(s) and prompts that include information relating to supplemental content items. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be an electronic device, a personal computer (PC), a laptop computer, a tablet computer, a WebTV box, a personal computer television (PC/TV), a PC media server, a PC media center, a handheld computer, a mobile telephone, a smartphone, a mixed reality device, or any other device, computing equipment, or wireless device, and/or combination of the same that is capable of performing the embodiments disclosed herein.

Control circuitries 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitries 220 and/or control circuitry 218 are configured for establishing a live streaming between a presenter device and a plurality of participant devices, providing user interfaces on the presenter device and the plurality of participant devices that allow exchange of messages, such as chats, and other content, such as images, videos, etc., identifying chat messages(s), analyzing content and context associated with the chat messages, using NLP techniques to analyze the chat message(s), determining prominence value of the chat message(s), using a plurality of factors so determine the prominence values, including relevance to the streaming session, using AI tools and associated algorithms to analyze the relevance and importance of the chat message(s) in relation to the streaming session, identifying supplemental content item(s) that are relevant to the chat message(s), generating for display a prompt on a user interface of the presenter device for presenting the information provided in the prompt, determining a location on the user interface, based on the presenter's gaze, to display the prompt, including a variety of information in the prompt, including promotional information for a supplemental content item that may be relevant to the chat message(s), determining engagement of the participant devices based on the presentation of the information from the prompt, determining whether the information provided in the prompt was accurately presented by the presenter, reporting both engagement and accuracy metrics to the supplemental content provider or a sever, determining and reporting timing of the information presented, e.g., including whether it was presented within a timer provided, overlaying supplemental content items on objects in the presenter's background that are visible to the participant devices, and utilizing NLP, AI, and ML engines to execute associated algorithms for determining various solutions described herein, and performing functions related to all other processes and features described herein.

Computing device 218 receives a user input 204 at input circuitry 216. For example, computing device 218 may receive data relating to prominence values of chat message(s) and prompts that include information relating to supplemental content items. Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, or movement or gestures to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1, 4-14, respectively.

FIG. 3 is a block diagram of presenter device and its components used for live streaming during a live streaming session, in accordance with some embodiments of the disclosure. In an embodiment, the equipment device 300, is the same equipment device 202 of FIG. 2. The equipment device 300 may receive content and data via input/output (I/O) path 302. The I/O path 302 may provide audio content. The control circuitry 304 may be used to send and receive commands, requests, and other suitable data using the I/O path 302. The I/O path 302 may connect the control circuitry 304 (and specifically the processing circuitry 306) to one or more communications paths or links (e.g., via a network interface), any one or more of which may be wired or wireless in nature. Messages and information described herein as being received by the equipment device 300 may be received via such wired or wireless communication paths. I/O functions may be provided by one or more of these communications paths or intermediary nodes but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor).

In client-server-based embodiments, the control circuitry 304 may include communications circuitry suitable for establishing a live streaming between a presenter device and a plurality of participant devices, providing user interfaces on the presenter device and the plurality of participant devices that allow exchange of messages, such as chats, and other content, such as images, videos, etc., identifying chat messages(s), analyzing content and context associated with the chat messages, using NLP techniques to analyze the chat message(s), determining prominence value of the chat message(s), using a plurality of factors so determine the prominence values, including relevance to the streaming session, using AI tools and associated algorithms to analyze the relevance and importance of the chat message(s) in relation to the streaming session, identifying supplemental content item(s) that are relevant to the chat message(s), generating for display a prompt on a user interface of the presenter device for presenting the information provided in the prompt, determining a location on the user interface, based on the presenter's gaze, to display the prompt, including a variety of information in the prompt, including promotional information for a supplemental content item that may be relevant to the chat message(s), determining engagement of the participant devices based on the presentation of the information from the prompt, determining whether the information provided in the prompt was accurately presented by the presenter, reporting both engagement and accuracy metrics to the supplemental content provider or a sever, determining and reporting timing of the information presented, e.g., including whether it was presented within a timer provided, overlaying supplemental content items on objects in the presenter's background that are visible to the participant devices, and utilizing NLP, AI, and ML engines to execute associated algorithms for determining various solutions described herein, and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, or any other suitable fixed or removable storage devices, and/or any combination of the same. The storage 308 may be used to store various types of content, (e.g., information relating to the presenter and participant devices, chat messages and other content posted within the streaming session, analysis results relating to the content and context of the chat messages, prominence value of the chat message(s), supplemental content item(s), prompt(s) and the information within the prompts, timing, accuracy, and engagement metrics associated with the presentation by the presenter, AI and ML algorithms, and data relating to all other processes and features described herein). Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech, for example a participant may voice text a chat message via the microphone. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The electronic device 300 may include an interface 310. The interface 310 may be any suitable user interface, such as a remote control, mouse, trackball, keypad, keyboard, touchscreen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to implementing machine learning (ML) and artificial intelligence (AI) algorithms, and all the functionalities discussed associated with the figures mentioned in this application.

Figure 4:
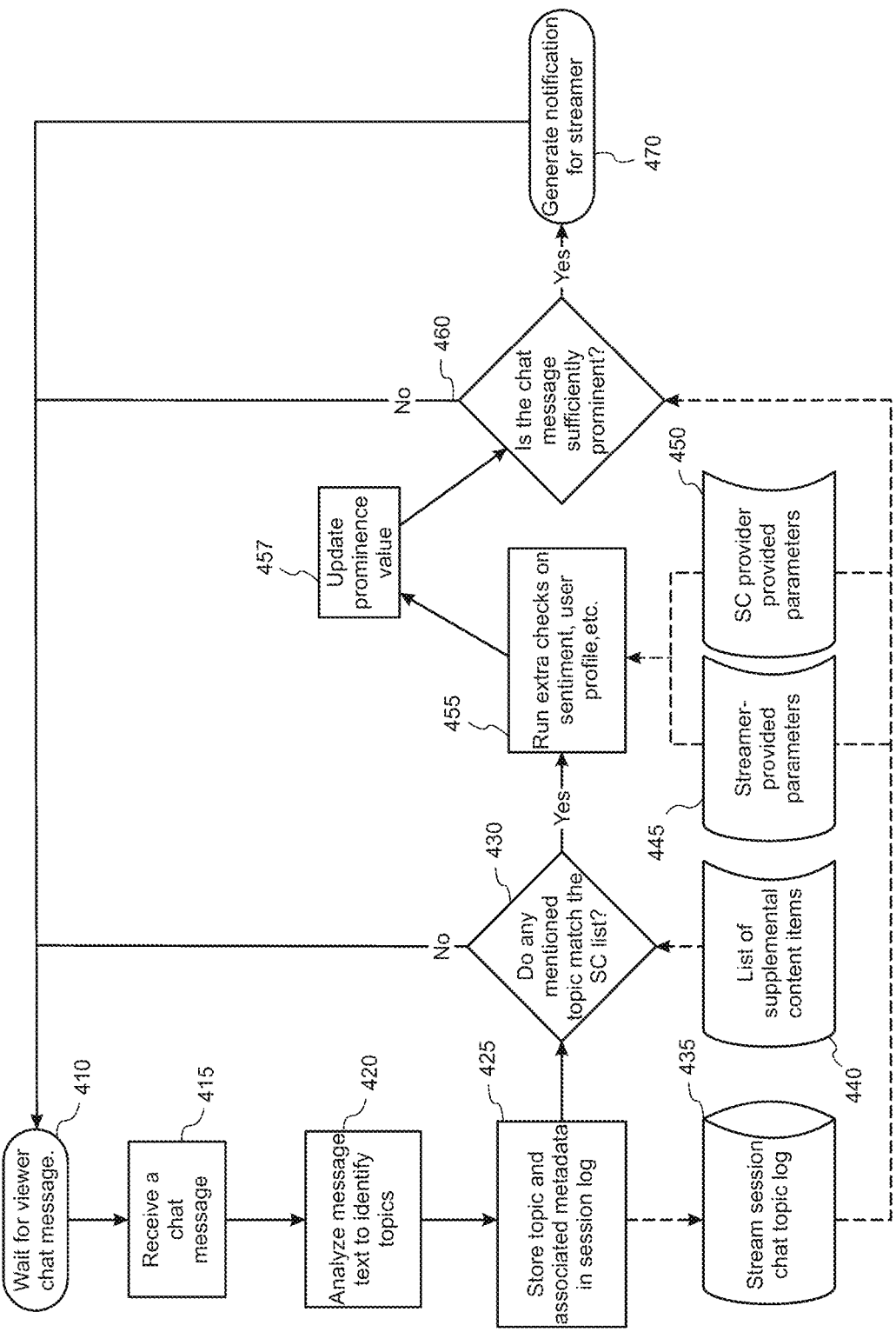
FIG. 4 is a flowchart of a process for analyzing chat messages and generating prompts for displaying, within a live streaming session, a supplemental content item(s) that is contextually relevant to the analyzed chat messages, in accordance with some embodiments of the disclosure.

FIG. 4 is a flowchart of a process for analyzing chat messages and generating prompts for displaying, within a live streaming session, a supplemental content item(s) that is contextually relevant to the analyzed chat messages, in accordance with some embodiments of the disclosure.

The process 400 may be implemented, in whole or in part, by systems or devices such as those shown in FIGS. 2-3. One or more actions of the process 400 may be incorporated into or combined with one or more actions of any other process or embodiments described herein. The process 400 may be saved to a memory or storage (e.g., any one of those depicted in FIGS. 2-3) as one or more instructions or routines that may be executed by a corresponding device or system to implement the process 400.

In some embodiments, the control circuitry 200 and/or 228 may initiate a streaming session that includes a presenter and a plurality of participants. The streaming platform that provides a presenter UI to the presenter device and a participant UI to the participants' devices may be used to connect the presenter to the one or more participants via a network. Once the streaming session is initiated, e.g., such as started by a presenter, the control circuitry 200 and/or 228, at block 410, may wait to receive a text chat message from one of the participants of the streaming session.

At block 415, the control circuitry 200 and/or 228 may receive a chat message that was inputted by a participant of the chat session. The participant may use their own device's UI that is associated with the streaming platform to input the chat message.

Once a participant enters a chat message using their UI platform, the chat message may be posted by the control circuitry, such as in real time, within the live streaming session. In some embodiments, the chat message may be analyzed to ensure it conforms to the requirements of the streaming platform, the streamer, and sponsors, such as for inappropriate language, nudity, hate words, etc., before the chat message is posted within the streaming session.

At block 420, the control circuitry 200 and/or 228 may analyze the text of the chat message to identify topics that are associated with the chat message. To do so, in some embodiments, the control circuitry 200 and/or 228 uses a natural language processing (NLP) tool to extract relevant parameters from the chat message. In some embodiments, the analysis may result in associating a single topic with the chat message. For example, the topic of the chat message may be related to coffee. In other embodiments, the analysis may result in associating multiple topics with the chat message or group of chat messages. For example, a single chat may discuss coffee and breakfast, or multiple chats may discuss coffee and breakfast.

At block 425, the control circuitry 200 and/or 228 may store the topic and associated metadata of the chat message in a session log. There may be a separate session log for each live stream session. For example, if a presenter starts a session at 10:20 AM and ends the session at 10:50 AM, then the topics of chat for this 30-minute session and associated metadata may be saved in a session log. After having ended the session at 10:50 AM, if the presenter starts another session, e.g., a second session, at 11:00 AM and ends it at 11:30 AM, then the second session's log will be saved separately from the earlier session's log. In some embodiments, the presenter may be engaged in multiple sessions at the same time, such as by having multiple windows opened. Accordingly, each separate session's log may be saved separately.

At block 430, the control circuitry 200 and/or 228 determine whether any of the mentioned topics from the chat message match a supplemental content item in the list of supplemental content (SC) items 440, also referred to as presenter's list of sponsored offerings. To determine a match with a topic of the chat message, the control circuitry 200 and/or 228 may access the list of supplemental content items 440. A match may be a sponsored ad, product or service that is within the list of supplemental content items 440 and in the same genre or topic as the topic of the chat message. For example, if the topic of the chat message(s) is coffee, then Peet's Coffee and Philz Coffee, which may be in the list of supplemental content items 440, may be determined to be matches since they are associated with the topic coffee.

In some embodiments, the control circuitry 200 and/or 228 may also utilize artificial intelligence (AI) and machine learning (ML) engines and execute AI and ML algorithms to determine whether a topic of the chat message may be matched with a supplemental content item in the list of supplemental content items 440. In other embodiments, the control circuitry 200 and/or 228 may generate a list of topics or keywords for each of the supplemental content items in the list of supplemental content items 440 that is being endorsed, promoted, or sponsored by the presenter.

In some embodiments, a single supplemental content item may be determined to be a match for a topic of the chat message. In other embodiments, multiple supplemental content items may be determined to be a match for a topic of the chat message. When multiple supplemental content items are determined to be a match, then the control circuitry 200 and/or 228 may rank the multiple supplemental content items in terms of their relevance and importance to the chat messages. In some embodiments, when multiple supplemental content items are determined to be a match, then the control circuitry 200 and/or 228 may rank a particular supplemental content item higher based on a higher price paid by the supplemental content item's provider to the presenter. In other embodiments, the control circuitry 200 and/or 228 may use a round robin approach where, if a first supplemental content item was already presented, then a second supplemental content item may be given its turn to be presented, and as such the rankings may change based on which supplemental content items were already presented.

In some embodiments, the control circuitry 200 and/or 228 may also utilize AI and ML engines and execute AI and ML algorithms to determine the best matched supplemental content item for the determined topic of the chat message.

If a determination is made, at block 430, that the topic of the chat message does not match a supplemental content item in the list of supplemental content items 440, then the control circuitry 200 and/or 228 may revert to block 410 and continue to monitor the chat messages and wait for the next viewer/participant chat message.

If a determination is made, at block 430, that the topic of the chat message matches a supplemental content item in the list of supplemental content items 440, then the control circuitry 200 and/or 228 may, at block 455, run extra checks on sentiment, user profile, etc. To do so, the control circuitry 200 and/or 228 may consider both the streamer-provided parameters 445 and the supplemental content (SC) provider-provided parameters 450. The streamer-provided parameters 445 may include, for example, parental restrictions, genre, and budget. The streamer-provided parameters 445 may be analyzed by the control circuitry and considered before making a supplemental content suggestion to the presenter/streamer. For example, if the streamer-provided parameters 445 restrict alcoholic products, then even though the topic of the chat message may be associated with alcohol, and the streamer may have an alcoholic product in their list of supplemental content items 440, such alcohol-related supplemental products may not be recommended when such a parameter restriction is turned on. On the other hand, the streamer-provided parameters 445 may include a preference for a certain genre of products and for a certain topic, and when such a topic is determined for a chat message, the presenter preference may be considered in selecting a supplemental content item and populating it in a prompt to the presenter.

Likewise, in some embodiments, the control circuitry 200 and/or 228 may consider SC provider-provided parameters 450 before suggesting a particular supplemental content item. For example, a provider may not want their product associated with a certain topic, and if such a topic is determined for a chat message, even if that topic is related to the provider's supplemental content item, such supplemental content item may not be suggested to the streamer for presentation. SC provider-provided parameters 450, in some embodiments, may also include parameters to identify content suggestion opportunities in the live, real-time streaming context. Such parameters may include, for example, presenter profiles and presenter histories, relevant topics, context of the chat and overall stream, partners/sponsors, endorsed goods/services, and other presenter-provided and SC provider-provided parameters.

Similarly, every participant of the streaming session may also have a list of preferences and restrictions as their parameters. The participant may list their preferences and restrictions in their user profile. Such preferences and restrictions may be considered by the control circuitry 200 and/or 228 and a prompt dynamically populated for the presenter may account for such preferences and restrictions. For example, if the participant restricts a certain supplemental product due to its costs, genre, location of its availability, etc., then such restrictions may be considered, and a supplemental content item that does not violate such parameters may be populated for the presenter to present to the participant.

At block 457, in some embodiments, a prominence value determined may be updated. The update may include increasing or decreasing the prominence value. For example, once a prominence value of a topic associated with the chat is determined, such as by analyzing a group of chat messages to determine a topic that is collectively being discussed, when new chat message is posted, a determination may be made whether the content of new chat message is relevant to the topic or is directed towards a different topic. If its relevant to the topic, it may bolster that prominence of that topic and as such the prominence value may be increased. Block 457 may be performed before block 460 or after block 460.

At block 460, the control circuitry 200 and/or 228 may determine if the chat message is sufficiently prominent. In other words, the control circuitry 200 and/or 228 may determine whether the relevance and/or importance of the chat message is sufficient to warrant presenting a supplemental content item(s) within the streaming session. Since not all topics may rise to a sufficient level of prominence, every chat message may not be responded to by populating a prompt for the presenter to present a supplemental content item. For example, some topics may be casual chatter or unrelated to a product or service offered within the list of sponsored supplemental content items 440.

In some embodiments, the control circuitry 200 and/or 228 may analyze a chat message or a group of chat messages and determine their contribution to a topic's prominence value. In some embodiments, a single chat message may be associated with a single topic, while in other embodiments, a single chat message may be associated with multiple topics. The control circuitry 200 and/or 228 may then compare the prominence values with a predetermined threshold to determine whether the prominence value associated with the chat message, and/or the topic exceeds the predetermined threshold. If it does, then the control circuitry 200 and/or 228 may deem such a chat message and/or topic to be sufficiently prominent. The control circuitry 200 and/or 228 may also use factors such as a) whether the message addresses a problem, b) whether the message addresses a desire, c) whether the chat message is relevant to a topic of the streaming session, and/or d) whether words from the chat message were repeated in the live streaming session either by the same participant or by multiple participants in evaluating the prominence of the chat message. In addition to these factors, the system, presenter, or a provider of a supplemental content item may input any other factor to be used by the control circuitry in evaluating the prominence of the chat message and scoring a prominence value.

In yet other embodiments, the control circuitry 200 and/or 228 may look to other activities, such as a topic of the chat message being stored in the user's profile or the presenter's profile, a topic discussed during a previous streaming session, or a topic that is trending on social media, in evaluating the prominence of the chat message. For example, if a topic on the social media is currently trending, then a chat message that relates to such a topic may automatically be boosted to contribute more to that topic's predominance value.

If a determination is made, at block 460, that the chat message and/or topic is not sufficiently prominent, then the control circuitry 200 and/or 228 may revert to block 410 and continue to monitor chat messages in the streaming session and wait for the next viewer/participant chat message.

If a determination is made, at block 460, that the chat message and/or topic is sufficiently prominent, e.g., the prominence value of the chat message exceeds a predetermined threshold, then the control circuitry 200 and/or 228 may generate a notification (also referred to as a prompt) at block 470 for the streamer/presenter. In some embodiments, the presentation of the supplemental content item may be verbal. In such embodiments, a prompt may be dynamically populated with a script and details relating to a supplemental content item that is to be verbally presented by the presenter to the participants of the streaming session. One example of such a prompt is displayed in FIG. 9. When the supplemental content is to be presented verbally, the dynamically populated prompt may be displayed at the current location of the presenter's gaze. It may also be displayed as a pop-up, as a ticker, or in a designated section of the UI on the presenter device. In other embodiments, the presentation of the supplemental content item may be in other forms, such as a pop-up, ticker, background overlay or other forms as described in relation to FIG. 12 below.

Figure 5:
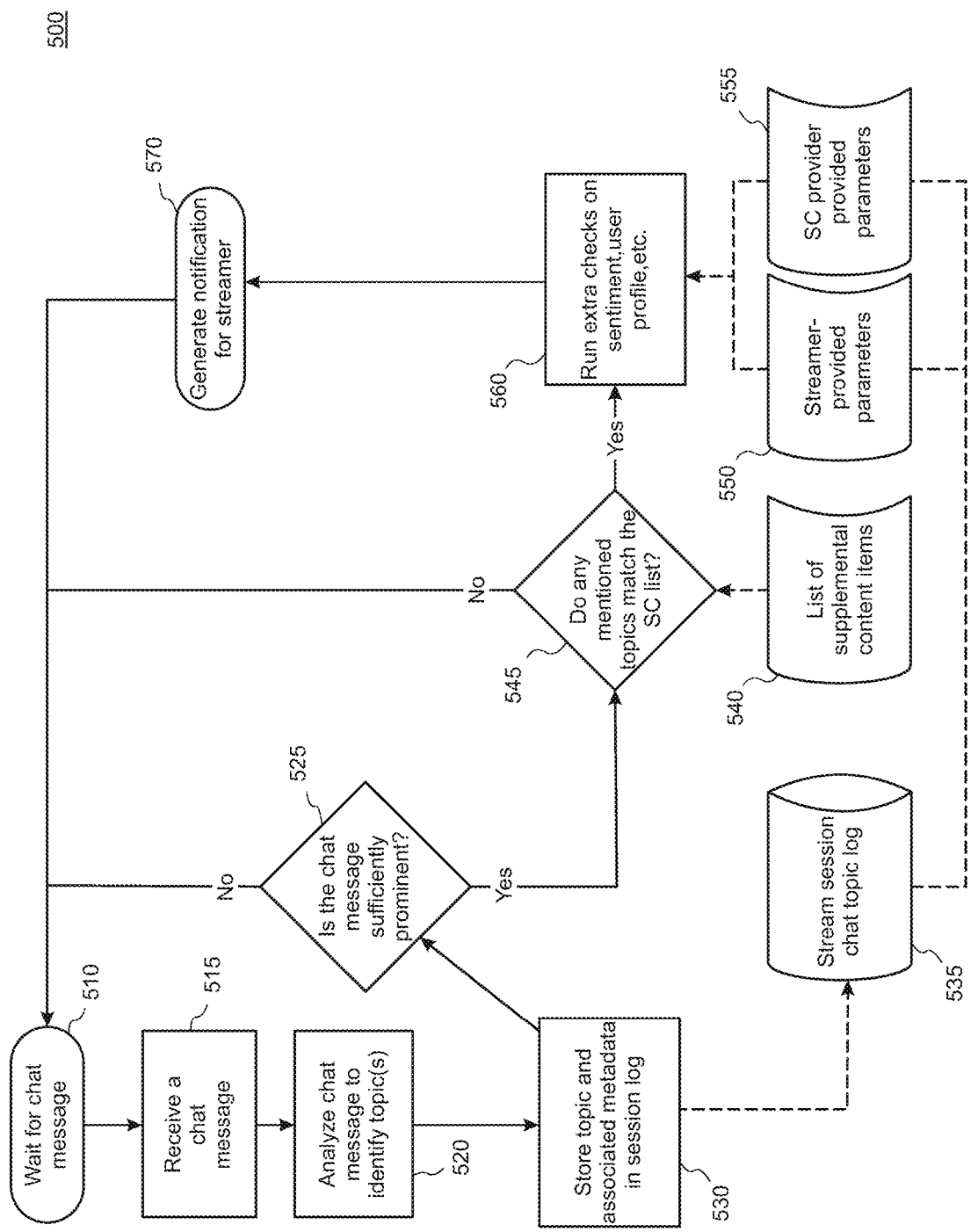
FIG. 5 is another flowchart of another process for analyzing chat messages and generating prompts for displaying, within a live streaming session, a supplemental content item(s) that is contextually relevant to the analyzed chat messages, in accordance with some embodiments of the disclosure.

FIG. 5 is another flowchart of another process for analyzing chat messages and generating prompts for displaying, within a live streaming session, a supplemental content item(s) that is contextually relevant to the analyzed chat messages, in accordance with some embodiments of the disclosure.

The process 500 may be implemented, in whole or in part, by systems or devices such as those shown in FIGS. 2-3. One or more actions of the process 500 may be incorporated into or combined with one or more actions of any other process or embodiments described herein. The process 500 may be saved to a memory or storage (e.g., any one of those depicted in FIGS. 2-3) as one or more instructions or routines that may be executed by a corresponding device or system to implement the process 500.

In some embodiments, process 400 of FIG. 4 determines a match between a topic mentioned in a chat message and a supplemental content item from the list of supplemental content items 440. Once a match is found, then process 400 is used to run extra checks 455 using streamer- and provider-provided parameters. Once the checks are run, then process 400 is used to determine whether the chat message is sufficiently prominent. Instead of using steps 430, 455, and 460 in a sequence that determines whether the topic of the chat message is associated with a supplemental content item in the list of supplemental content items 440, process 500 determines a prominence level of the chat message and then proceeds to determining whether there is a match with a supplemental content item. In other words, the control circuitry 200 and/or 228 using process 500 may calculate the prominence value of the chat message (or group of chat messages) and may then proceed to the next steps of determining a match if a determination is made that the prominence value of the chat message exceeds a predetermined threshold. If a determination is made that the prominence value of the chat message does not exceed the predetermined threshold, then the control circuitry 200 and/or 228 may continue to monitor the chat messages and wait for a chat message at block 510. The control circuitry 200 and/or 228 may continue to wait until a chat message that has a prominence value that exceeds the predetermined threshold is identified to proceed to the next steps of matching the topic of the chat message with a supplemental content item that the presenter is endorsing, promoting, or sponsoring.

Referring to FIG. 5, in some embodiments, the control circuitry 200 and/or 228 may initiate a streaming session that includes a presenter and a plurality of participants. Once the streaming session is initiated, e.g., such as started by a presenter, the control circuitry 200 and/or 228, at block 510, may wait to receive a chat message from one of the participants of the streaming session. After the chat message is received at block 515, the control circuitry 200 and/or 228, at block 520, may analyze the text of the chat message to identify topics that are associated with the chat message. To do so, in some embodiments, the control circuitry 200 and/or 228 may use an NLP tool to extract relevant parameters from the chat message. The control circuitry 200 and/or 228 may also utilize an AI engine running an AI algorithm to identify the topics.

In some embodiments, the stored topic and associated metadata in session log may be considered in determining whether the chat message is sufficiently prominent. For example, a previous chat message from the session log may be associated with the topic as the current chat message that is being evaluated for being sufficiently prominent at block 525. If the previous chat message from the session log is related to the same topic as the current chat message, then that would increase the prominence of the current chat message as more people in the chat session are discussing the same topic (i.e., accordingly the topic may be important to the session).

At block 525, the control circuitry 200 and/or 228 may determine if the chat message and/or topic is sufficiently prominent. Such a determination may be made to distinguish between a chat message and/or a topic that spurred ongoing discussion from one that did not spark discussion. To determine if the chat message and/or the topic is sufficiency prominent, the control circuitry 200 and/or 228 may analyze the chat message and update the prominence value for the associated topic.

Several factors may be used to determine a topic's prominence value. For example, factors that determine a) whether the topic of the chat message is relevant to a topic of the streaming session, b) whether the topic of the chat message was repeated in the chat session either by the same participant or by multiple participants, c) whether the topic of the chat message is trending on social media, d) whether the topic of the chat message is stored in a user's profile, e.g., the presenter or a participant's profile, and e) whether the topic of the chat message was previously discussed during a current or previous chat session. With respect to determining prominence value of the chat (or group of chat messages) based on whether the topic of the chat message is relevant to a topic of the streaming session, the control circuitry 200 and/or 228 may determine the topic of the live stream session. Several methods may be used to determine the topic of the streaming session. One method of determining the topic of the streaming session may be by accessing an agenda or list of topics to be discussed in the streaming session or access the title of the streaming session. Another method of determining the topic of the streaming session may be by analyzing speech input of the streamer during the streaming session and processing the speech input using natural language processing (NLP) and artificial intelligence processing (AI) to determine the topic being presented. Metadata associated with streaming session may also be analyzed to determine the topic of the streaming session. Once the topic of the streaming session is determined, a chat posted may be compared to the topic of the streaming session to determine whether the content and context of the chat relates to the determined topic of the streaming session. The topic of the chat posted, including its content and context, may also be determined by applying the NLP and AI techniques mentioned above. A higher prominence value may be assigned to the chat topic if the content and context of the chat topic closely matches the determined topic of the streaming session.

In addition to these factors, the system, presenter, or a provider of a supplemental content item may input any other factor to be used by the control circuitry in evaluating the prominence of the topic and scoring a prominence value.

Once the prominence value is calculated, the control circuitry 200 and/or 228 may compare the prominence value with a predetermined threshold to determine whether the prominence value associated with the topic exceeds the predetermined threshold, in other words, whether the topic is sufficiently prominent.

If the prominence value associated with the topic indicates that the chat message is not sufficiently prominent, then the process reverts from block 525 to block 510, where the control circuitry 200 and/or 228 may continue to monitor the chat messages and wait for the next viewer/participant chat message.

If the updated prominence value associated with the topic exceeds a threshold value, then the process moves from block 525 to block 545, where the control circuitry 200 and/or 228 may determine whether any of the mentioned topics from the chat message match a supplemental content item in the list of supplemental content (SC) items 540. If a determination is made, at block 545, that the topic of the chat message does not match a supplemental content item in the list of supplemental content items 540, then the control circuitry 200 and/or 228 may continue to monitor chat messages and wait for the next viewer/participant chat message at block 510.

If a determination is made, at block 545, that the topic of the chat message matches a supplemental content item in the list of supplemental content items 540, then the control circuitry 200 and/or 228 may run extra checks at block 560, which include considering both the streamer-provided parameters 550 and the supplemental content provider-provided parameters 555. The supplemental checks may also include checking if participant-listed parameters are satisfied. The participant may list as parameters which types of supplemental content items are preferred and which are restricted in their user profile.

In some embodiments, based on running the extra check, if a determination is made that the streamer-provided parameters 550 and/or the supplemental content provider-provided parameters 555 are not satisfied, then the process may return to block 510 (not shown in the figure).

If the extra checks are satisfied, then the control circuitry 200 and/or 228 may generate a notification (also referred to as a prompt) at block 570 for the streamer/presenter. One example of such a prompt is displayed in FIG. 9.

Furthermore, at block 530, the control circuitry 200 and/or 228 may store the topic and associated metadata of the chat message in a session chat topic log and stream the session chat topic log at 535 to blocks 550 and 555.

Figure 6:
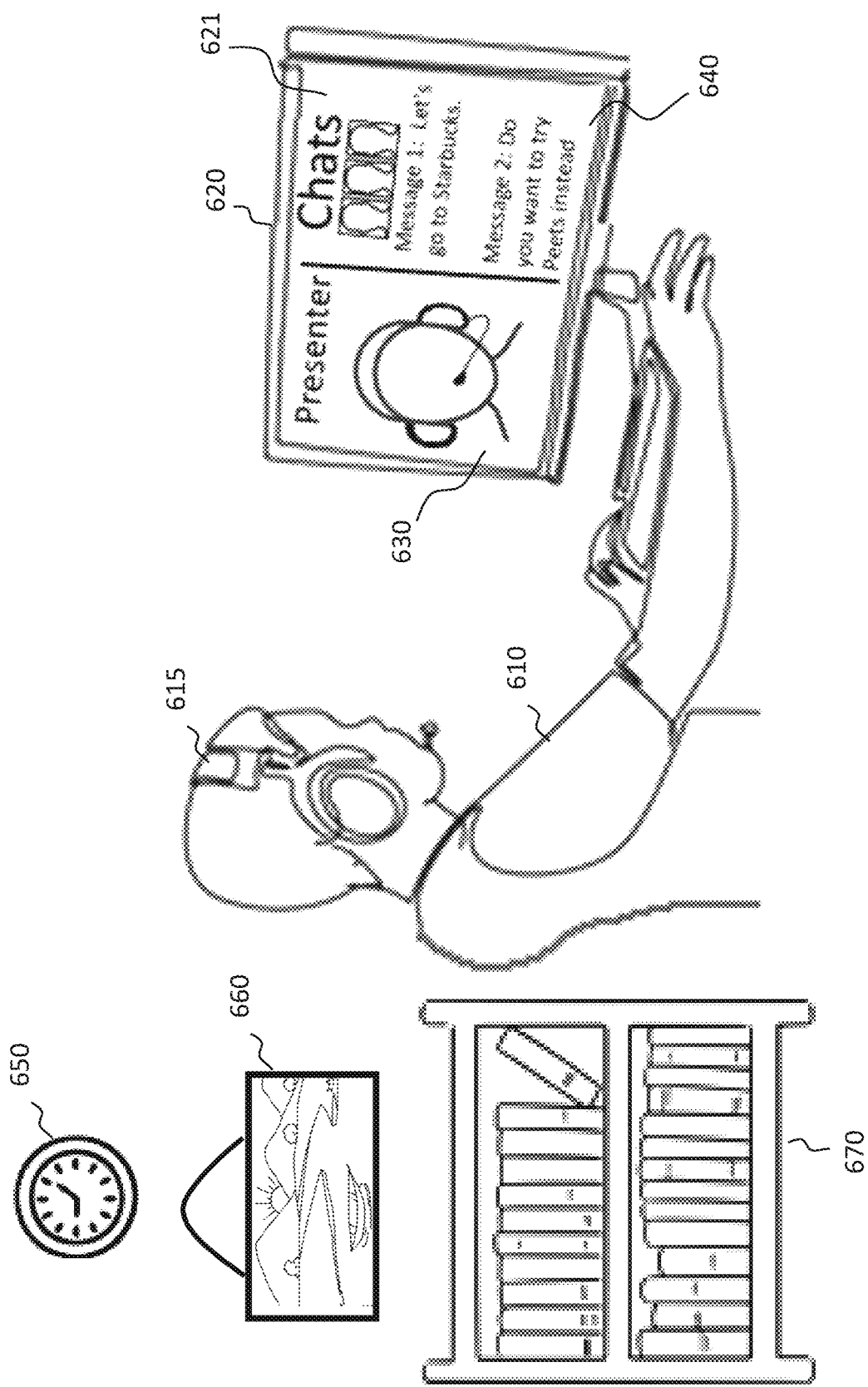
FIG. 6 is an example of a presenter workstation and setup used by a presenter for presenting content during a live streaming session, in accordance with some embodiments of the disclosure.

FIG. 6 is an example of a presenter workstation and setup used by a presenter for presenting content during a live streaming session, in accordance with some embodiments of the disclosure. In some embodiments, a presenter 610 may be using a presenter device 620 to start a live streaming session. Although a desktop computer is depicted as a presenter device, the embodiments are not so limited and include other electronic devices, such as a laptop, smart TV, mobile phone, or any other electronic device that is capable of connecting to the internet to provide a live streaming session and able to provide a live chat exchange between the presenter and the participants.

The presenter device may display a presenter UI 621 that may be associated with a streaming platform. Once the presenter starts the streaming session, the UI 621 on the presenter device may display a presenter section 630 that shows the presenter and a chat section 640 that is used for displaying chat messages from the presenter and participants of the streaming session. In some embodiments, the UI 621 may also designate a section for displaying a prompt, such as the prompt in FIG. 9, to the presenter. Although a few sections of the UI 621 are displayed, the embodiments may include other sections that may display other tools that can be used by the presenter. In some embodiments, other features may also be implemented in the UI 621 that may increase engagement with the audience.

Figure 7:
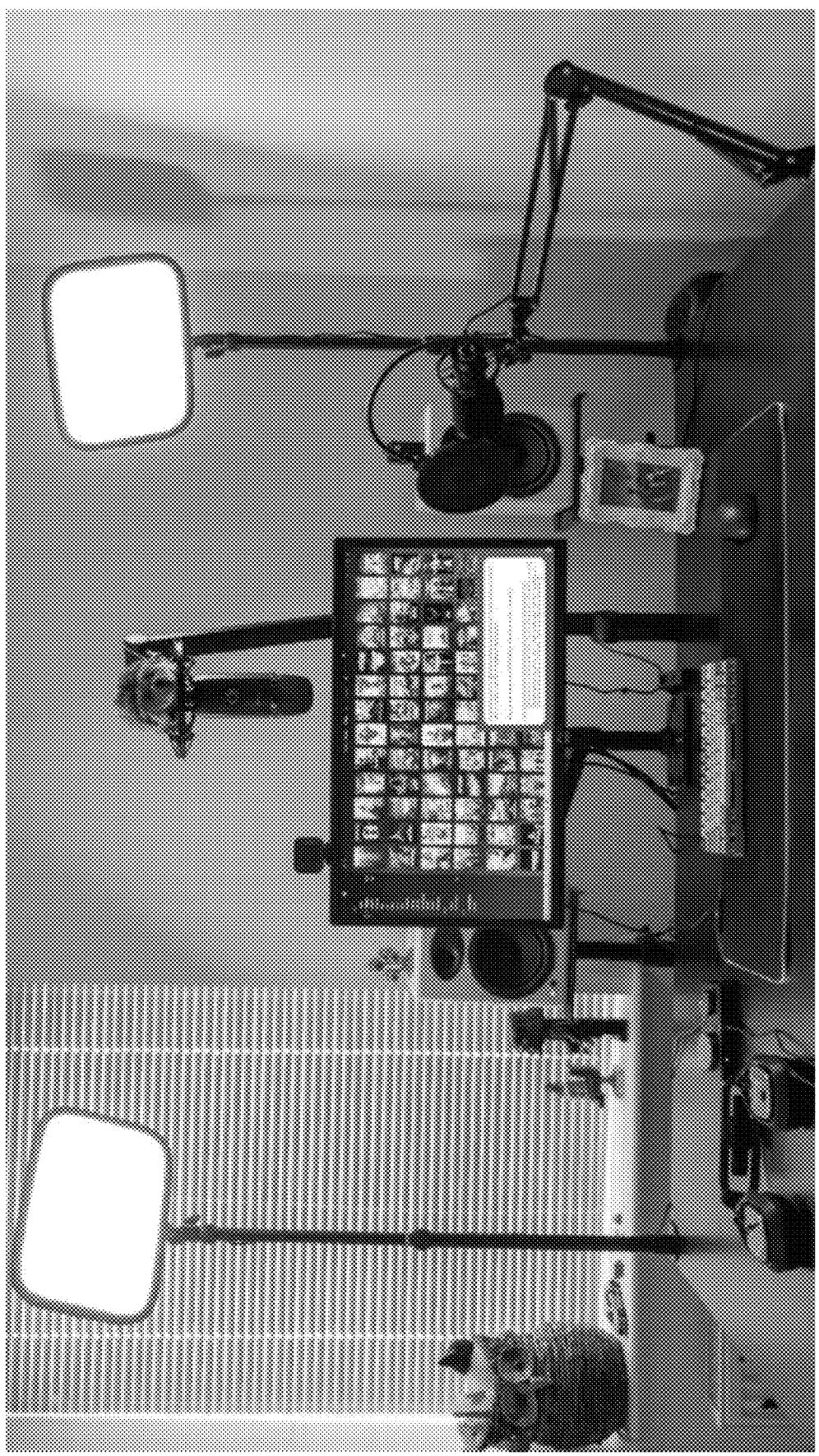
FIG. 7 is another example of a presenter workstation and setup used by a presenter for presenting content during a live streaming session, in accordance with some embodiments of the disclosure.

The presenter workstation and equipment used may include the presenter device 620 and a headset 615, which may include a microphone and a speaker. The presenter workstation and equipment may come in several types. For example, one type of presenter workstation, as depicted in FIG. 7, may include face lights and a separate microphone. Other types of presenter workstations may include noise cancelling equipment, sound insertion tools, and other equipment that is typically used by talk show hosts or radio show hosts, or in streaming sessions.

Different backgrounds may be presented depending on where the streamer/presenter sits to live stream their presentation. For example, as depicted in FIG. 6, the streamer's background includes a clock 650, a painting 660, and a bookshelf 670. In some embodiments, depending on the field of view of the camera associated with the presenter device, some of the presenter background may be visible to the participants, since the streamer may have their camera on while presenting. The objects displayed in the streamer's background may be objects that may be used to overlay supplemental content items. For example, the clock may be replaced with a brand name clock that may be a product that the streamer is promoting and is included in the list of supplemental content items. The painting may be replaced by an ad for a supplemental content item that is contextually relevant to the topic of the chat message.

Figure 8:
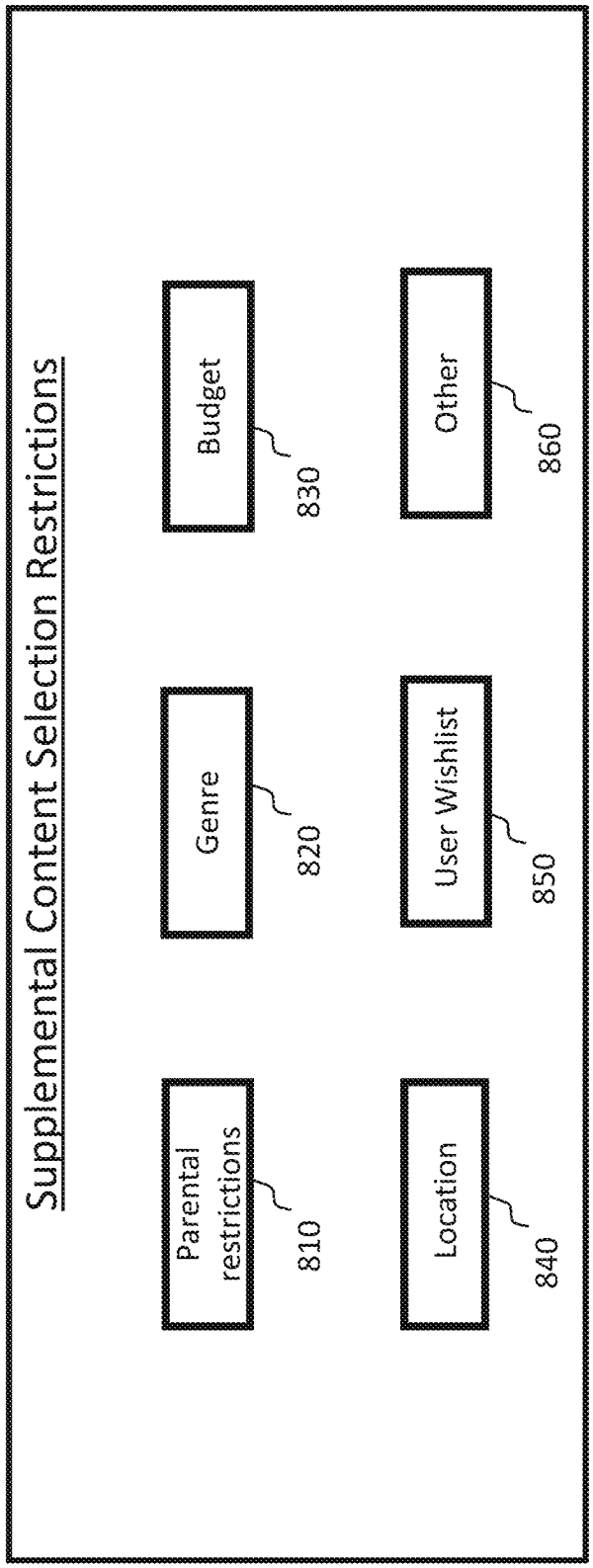
FIG. 8 is a block diagram of supplemental content item selection restrictions, in accordance with some embodiments of the disclosure.

FIG. 8 is a block diagram of supplemental content item selection restrictions, in accordance with some embodiments of the disclosure. In some embodiments, streamer/presenter-provided parameters, such as those referred at block 104 of FIG. 1, at 445 in FIG. 4, and 550 in FIG. 5, may be considered prior to dynamically populating a prompt with a supplemental content item suggestion. Likewise, content item provider-provided parameters, such as those referred at block 104 of FIG. 1, at 450 in FIG. 4, and 555 in FIG. 5, may be considered prior to dynamically populating a prompt with a supplemental content item suggestion. Additionally, every participant may also have a list of preferences and restrictions as their parameters that may be listed in their user profile. Such preferences and restrictions may be considered prior to suggesting a supplemental content item to the presenter in a prompt.

In some embodiments, the streamer-provided parameters 445 or 550 may restrict certain types of content items to be suggested in a prompt when a certain topic of a chat message is determined. These restrictions may include, for example, parental restrictions 810, genre-related restrictions 820, budget-related restrictions 830, and location-related restrictions 840. In other embodiments, the streamer provided parameters 445 or 550 may be preferences about, instead of restrictions on, the type of content items to be suggested in a prompt when a certain topic of a chat message is determined. Such preferences may be listed in the presenter or user's wishlist 850 or in other forms 860.

In some embodiments, the control circuitry may review the participant's preferences and restrictions before populating a prompt for the streamer to present a supplemental content item to the participant of the streaming session. For example, a participant may have set a budget for supplemental content items, i.e., to not show any supplemental content items that exceed the listed budget. Accordingly, supplemental content items or ads relating to only those products that are within the preferred budget may be suggested to the presenter. Other preferences may include certain ratings of reviews of the supplemental content item, e.g., to not suggest any supplemental content item that is rated below 4.5 stars, etc.

Figure 9:
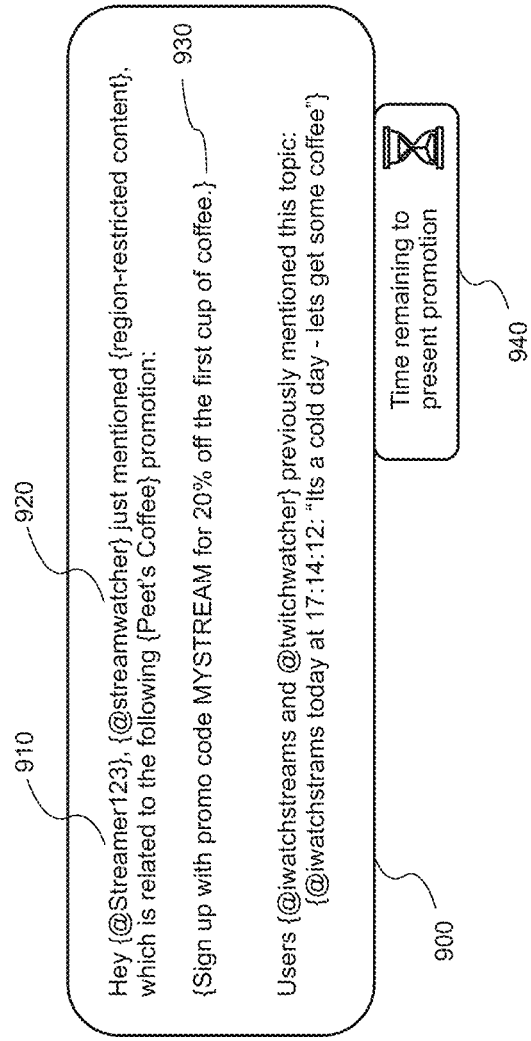
FIG. 9 is an example of a prompt displayed on a user interface of the presenter device, in accordance with some embodiments of the disclosure.

FIG. 9 is an example of a prompt displayed on a user interface of the presenter device, in accordance with some embodiments of the disclosure. In some embodiments, the prompt may include a script for the presenter associated with the presenter device to verbally (orally) present the supplemental content item during the streaming session. The prompt may be dynamically populated by the control circuitry based on determining a supplemental content item that matches the topic of the chat message.

In some embodiments, the prompt may notify the presenter that participant "Streamwatcher" 920 (the name of the participant) just mentioned a sponsored product, and as such the following script is being prepared for the presenter to follow up on the participant's mention and promote the product that is within the presenter's list of supplemental content items.

The prompt may also include, in some embodiments, the name(s) of the participant or participants and the content of the chat message(s) posted by the participant or participants. The prompt may also include the location of the participant, such as Paris, New York, etc., such that the streamer may take the location into consideration when presenting the promotion.

The prompt may also indicate which supplemental content item from the presenter's list contextually matches the posted chat message. For example, the prompt may indicate a single supplemental content item or multiple supplemental content items ranked in order of their relevance to the chat message. The prompt may also include a promotion, such as a discount code 930, such as the "MYSTREAM for 20% off" discount code depicted for a first cup of coffee.

In addition to the non-limiting example of the prompt depicted at 900, the prompt may also be customized to include any other desired information. For example, the presenter may want to know which other supplemental content items or ads the participant has responded to in the past such that the presenter may use such information to properly present the current supplemental content item. For example, if a participant has responded to a Product A that was presented to the participant in the past, and the presenter is presenting a Product B that is in the same space as Product A, then having such knowledge that the participant previously responded to Product A may provide leverage to the presenter by comparing both products and providing advantages of Product B over Product A.

Figure 10:
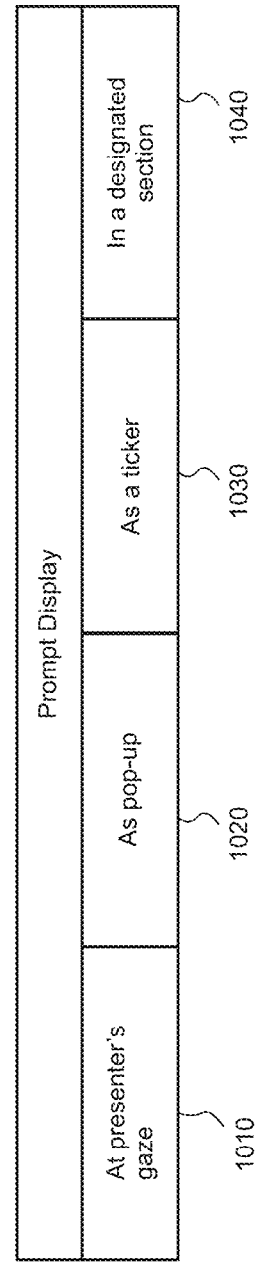
FIG. 10 is a block diagram of various methods of displaying the prompt, in accordance with some embodiments of the disclosure.

FIG. 10 is a block diagram of various methods of displaying the prompt, in accordance with some embodiments of the disclosure. The prompt 900 of FIG. 9 may be displayed at the location of the presenter's gaze 1010 on the presenter's streaming device, as a pop-up 1020 at a location within the UI of the presenter's streaming device, as a ticker 1030 at a location within the UI of the presenter's streaming device, or in a designated section 1040 of the UI of the presenter's streaming device. Other locations and formats of display of the prompt 900 are also contemplated in the embodiments.

With respect to displaying the prompt at the location of the presenter's gaze 1010, to do so, the control circuitry 200 and/or 228, using a camera associated with the presenter device, may monitor the gaze of the presenter. For example, the presenter may be gazing at a bottom right corner of the screen where a chat message may be posted, such as Message 2 at block 640 of FIG. 6. Upon determining that the presenter is currently gazing at the chat message at the bottom right corner of the screen, the control circuitry 200 and/or 228 may place the prompt at the same location to make it convenient for the presenter such that the presenter may not have to look elsewhere or move their gaze in order to focus on the prompt displayed.

In some embodiments, the control circuitry 200 and/or 228 may track the direction of the gaze, such as the direction of the presenter's eyeballs, and determine a location on the user interface to which the gaze is directed. As the eyeballs move, the control circuitry 200 and/or 228 may continue to track the direction of movement of the eyeballs and use such information to display the prompt in the direction of the movement.

With respect to pop-up 1020 and ticker 1030, the control circuitry 200 and/or 228 may place the prompt in such formats at any location on the UI of the presenter device. It may also have a designated section 1040 for placing the pop-up 1020 and/or the ticker 1030. The presenter may also configure the UI such that the prompt may be displayed in another desired format. When and if multiple prompts are displayed, the presenter may indicate that the first prompt is to be displayed in a first format and the second prompt is to be displayed in a second format, such as the first prompt at the presenter's gaze and second prompt as a ticker at the bottom of the UI.

Figure 11:
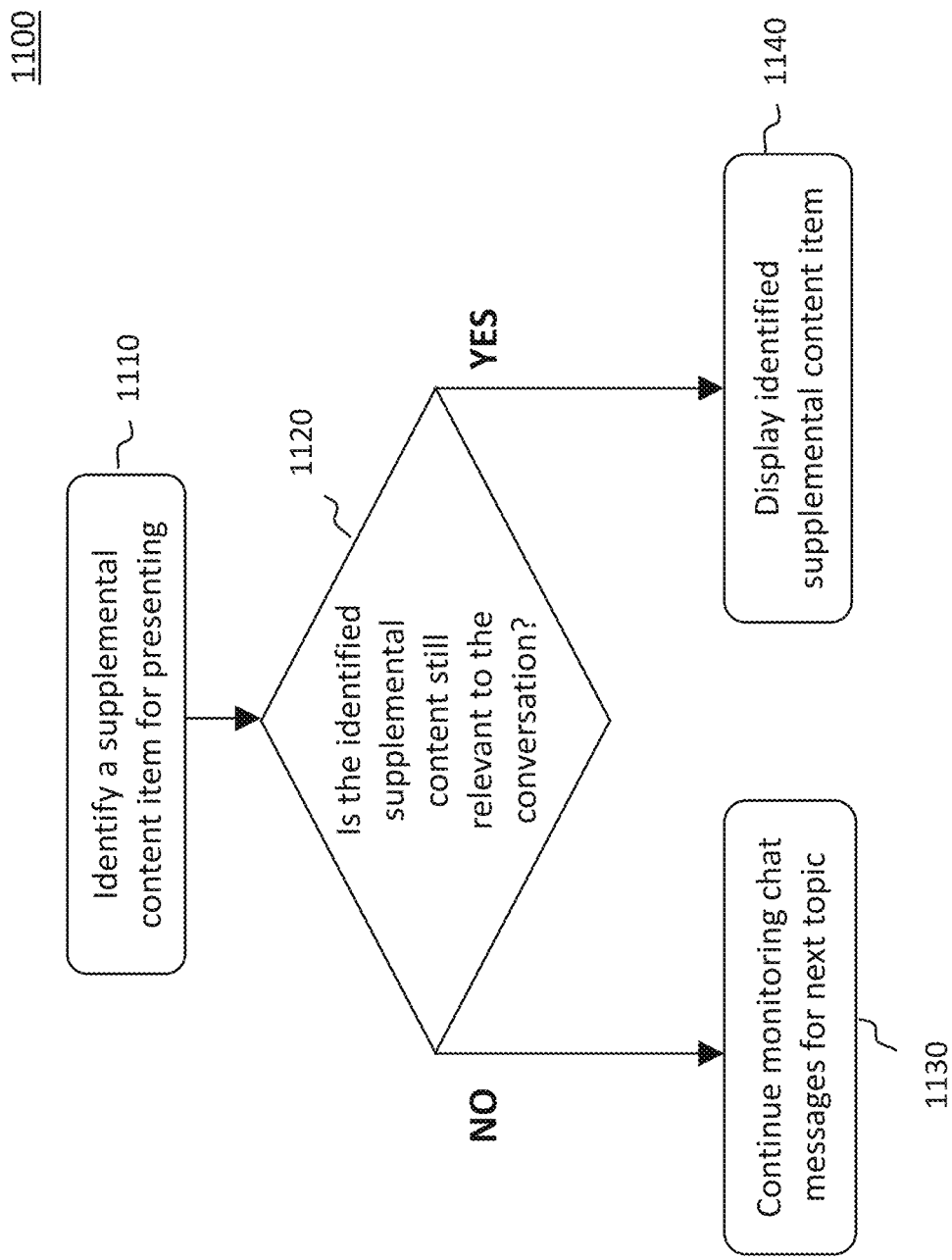
FIG. 11 is a flowchart of a process for determining relevance of the supplemental content item to a current topic being discussed in the live streaming session, in accordance with some embodiments of the disclosure.

FIG. 11 is a flowchart of a process for determining relevance of the supplemental content item to a current topic being discussed in the streaming session, in accordance with some embodiments of the disclosure.

The process 1100 may be implemented, in whole or in part, by systems or devices such as those shown in FIGS. 2-3. One or more actions of the process 1100 may be incorporated into or combined with one or more actions of any other process or embodiments described herein. The process 1100 may be saved to a memory or storage (e.g., any one of those depicted in FIGS. 2-3) as one or more instructions or routines that may be executed by a corresponding device or system to implement the process 1100.

At block 1110, the control circuitry 200 and/or 228 may identify a supplemental content item for presenting. The format of the presentation may be verbal, in which case a prompt, such as the prompt in FIG. 9, may be dynamically populated and displayed to the presenter in any one of the prompt display formats described in relation to FIG. 10. The prompt may include a script and/or other information, such as discount or promotion codes, that the presenter may review and present to the participants of the streaming session. The presentation may also be in other formats such as a background overlay 930 that overlays the supplemental content item on an object in the background of the presenter. Other displaying formats are described further in relation to FIG. 12 below.

At block 1120, the control circuitry 200 and/or 228 may determine whether the identified supplemental content item is still relevant to the conversation in the streaming session. In some embodiments, a chat message may be determined to be prominent when it exceeds the prominence threshold and a supplemental content item that is relevant to a topic of the chat message may be identified for presentation. However, the conversation in the chat may have moved on to other topics, making the identified supplemental content item irrelevant or too late to suggest to the participants. For example, a topic of the chat message may be posted on the streaming platform at 10:30 AM. The topic may relate to going out for coffee. Based on the determined topic, Peet's Coffee, which may be a supplemental content item endorsed by the presenter and in the presenter's list of supplemental content items, may be identified for presentation. However, at 10:32 AM, the conversation in the chat may have moved on from coffee. For example, participants may have rejected the idea of going out for coffee, selected an alternative to coffee, or decided to go out for coffee another day. Since the conversation may have moved on, it may not be the best time to present a supplemental content item related to coffee as the topic may be moot. Accordingly, to prevent from suggesting presentation of a supplemental content item that is moot or no longer relevant, the control circuitry 200 and/or 228 monitors the conversation in the chat messages to ensure that the supplemental content item is still relevant to the conversation at the time the supplemental content item is to be presented.

There may also be other reasons why the presentation of the identified supplemental content item may no longer be relevant to the streaming session. One such reason may be the timing of presentation of the supplemental content item by the streamer. For example, in some instances, the chats posted may be in a window or specific area of the streaming session platform. As more chats are posted, the older chats may be automatically scrolled down to make space for the newer chats. Since the chat window may be of confined space, in some instances, a posted chat that relates to coffee may either be at the bottom of the window or even disappeared from the window depending on the amount of chat activity. If the streamer is to promote Peet's coffee as the supplemental content item in response to the chat message relating to coffee, the timing of such presentation may be of importance. For example, if the streamer presents Peet's coffee at a time when the chat related to coffee is at the bottom of the window or no longer visible in the window, then such a presentation may not be relevant to the chat session. This is because the topic of coffee may be moot or other topics may have already been presented by other chat messages making the promotion irrelevant to the current chat session. Accordingly, in some embodiments, a timer (such as timer 940 in FIG. 9) may be displayed to inform the streamer to present the supplemental content item prior to the expiration of the timer to keep the supplemental content item relevant to the streaming session. The timer may be of any form, such as an hourglass, a seconds countdown clock, or a bar to display amount of time remaining for the streamer to present the supplemental content item, such as a promotion, during the live streaming session. If the supplemental content item is not presented within the time allotted by the timer, or the chat topic has changed, then the control circuitry may cause a removal of the displayed prompt from the presenter device that is associated with the supplemental content item that was to be presented prior to the expiration of the timer. The control circuitry may also monitor the pace of chats being posted and determine the likelihood of the chat relating to coffee being at the bottom of the window and alert the presenter prior to such an occurrence. The alert may inform the streamer to present the supplemental content item within 2 seconds, 5 seconds, or another time that the control circuitry estimates by when the relevant chat may end up at the bottom of the window. The control circuitry may also monitor intervening messages to determine whether the supplemental content item is still relevant to the topic of the chat session. In some embodiments, when the chat is no longer visible in the chat window, the control circuitry may provide an indication or pointer on the chat platform to the relevant message/topic (e.g., an arrow-up indicating that a promo code inserted in the chat window relates to a prior message.

Figure 12:
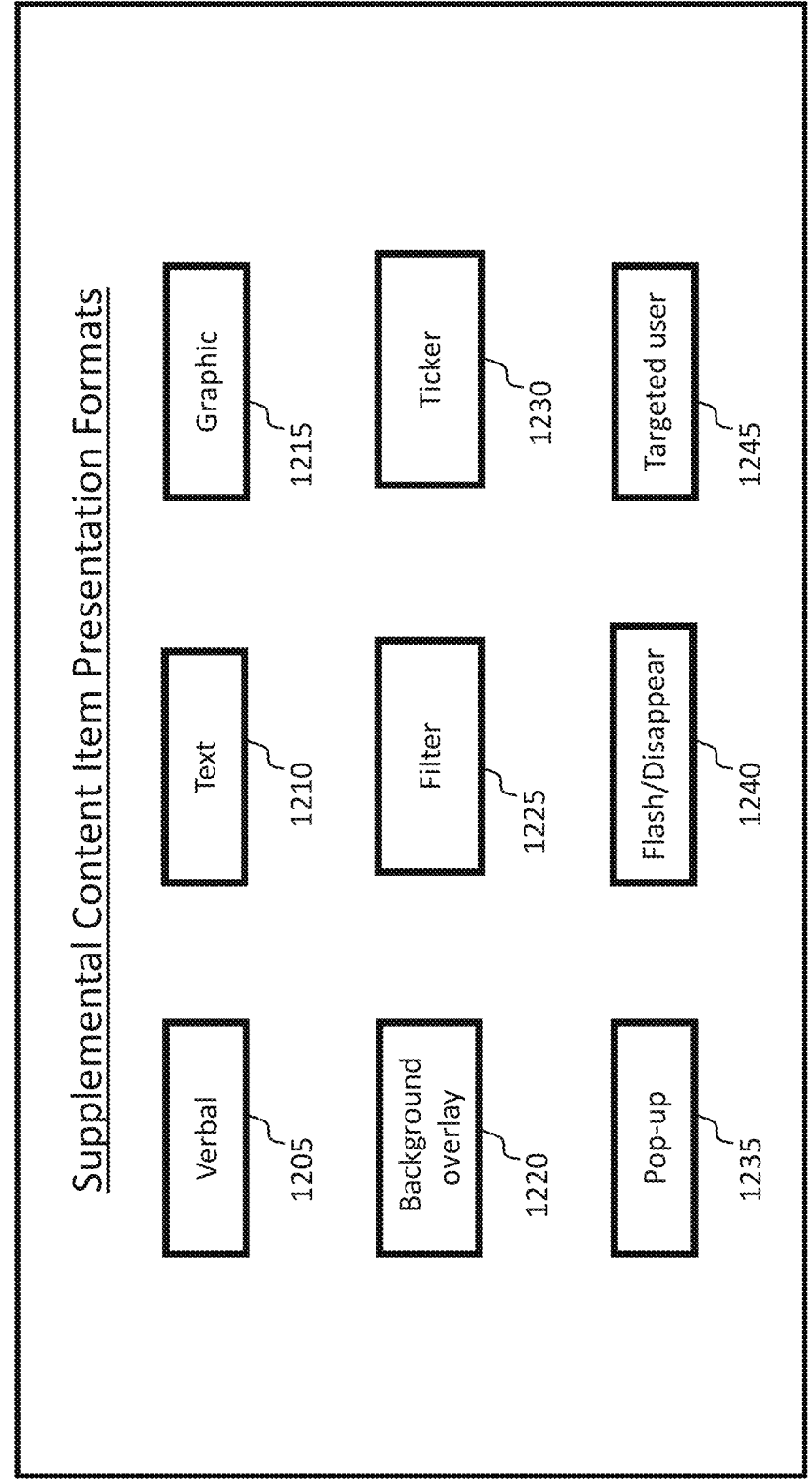
FIG. 12 is a block diagram of supplemental content item display formats, in accordance with some embodiments of the disclosure.

If a determination is made, at block 1120, that the supplemental content item is still relevant to the conversation in the chat at the time the supplemental content item is to be presented, then, at block 1140, the control circuitry 200 and/or 228 may display the identified supplemental content item in any one of the formats described in FIGS. 9 and 12.

If a determination is made that the supplemental content item is no longer relevant to the conversation in the chat, then, at block 1130, the control circuitry 200 and/or 228 may continue to monitor the chat messages for next topic and opportunities to present a supplemental content item while it is still relevant to the chat conversation.

FIG. 12 is a block diagram of supplemental content item display formats, in accordance with some embodiments of the disclosure. As described earlier, the supplemental content item may be presented in any one of a plurality of formats.

In some embodiments, the supplemental content item presentation format may be verbal 1205. In this format, the control circuitry 200 and/or 228 may dynamically populate a prompt and display the prompt to a presenter for verbally presenting the supplemental content item. The presenter may then read a script provided in the prompt during the live streaming session and verbally present the supplemental content item to the participants of the streaming session. In another embodiment, instead of a script, the prompt may include information that the presenter may use for presenting the supplemental content item to the participants. In this embodiment, the presenter may use their own style of presentation and use information from the prompt, such as a discount code, to present to the participants.

In some embodiments, the supplemental content item presentation format may be text 1210. In this format, control circuitry 200 and/or 228 may automatically display text on the participant's UI that includes details of the supplemental content item. In some embodiments, the control circuitry 200 and/or 228 may present the text to be displayed on the presenter's UI for approval and, upon approval, display the text relating to the supplemental content item on the streaming platform such that all the participants can see it or present it only on a specific participant's UI. In addition to text, the control circuitry 200 and/or 228 may also present a graphic 1215 related to the supplemental content item.

In some embodiments, the supplemental content item presentation format may be a background overlay 1220. In this format, control circuitry 200 and/or 228 may select an object that is in a background of the presenter and visible on the streaming platform for overlaying. The object selected may be in the field of view from the camera associated with the presenter device and may be visible to all the participants of the streaming session. In some embodiments, if the presenter selects the background to be blurred, then this option may not be available for presenting. In other embodiments, the control circuitry may identify an object for overlaying and seek presenter approval for unblurring the background if it has been previously blurred.

In some embodiments, the object selected for overlaying may be related to the genre of the supplemental content item that is to be overlaid on the object. For example, if the background includes a soda can and the supplemental content item is a beverage, then the control circuitry may select the soda can in the background as the object on which the supplemental content item is to be overlaid. The presenter may also place restrictions on certain objects in their background on which a supplemental content may not be overlaid. For example, the presenter may have a family photo in their background that they would not like to be used as an object on which a supplemental content item may be overlaid. Accordingly, the presenter may designate zones or objects upon which supplemental content items can and cannot be overlaid.

Figure 13:
FIG. 13 is an example of a supplemental content item displayed as a filter overlayed on a presenter associated with a presenter device, in accordance with some embodiments of the disclosure.

In some embodiments, the supplemental content item presentation format may be a filter 1225 that is overlaid on the presenter. In this format, control circuitry 200 and/or 228 may generate a filter that will provide an appearance of a virtual reality object overlaid on the participant. The virtual reality objects may be seen by participants during the streaming session. One example of such a filter is depicted in FIG. 13, where the control circuitry 200 and/or 228 may generate a filter that overlays a pair of swirly goggles 1310, stars 1320, and a character 1330 hitting a hammer on the participant's 1300 head. The filter delayed may be visible to all the participants during the streaming session.

In some embodiments, the supplemental content item presentation format may be a ticker 1230. In this format, control circuitry 200 and/or 228 may generate a ticker at the bottom of the UI of the participant that provides information relating to the supplemental content item, such as a discount code.

Other formats used may include pop-ups or flash/disappear techniques. Using these formats, the control circuitry 200 and/or 228 may present the supplemental content item as a pop-up 1235 on the participant's UI. The control circuitry 200 and/or 228 may also animate the supplemental content item such that it may flash and disappear in a few seconds on the participant's UI.

The formats described in FIG. 12 may be targeted 1245 to a specific participant/user(s) or may be aimed at all the participants of the streaming session. When the supplemental content item is targeted to a specific participant, the control circuitry may make the supplemental content item appear only on the UI of the specific participant. When the supplemental content item is generally for the streaming session, it may be presented to all the participants during the streaming session, either on the streaming platform or on every participant's UI.

Figure 14:
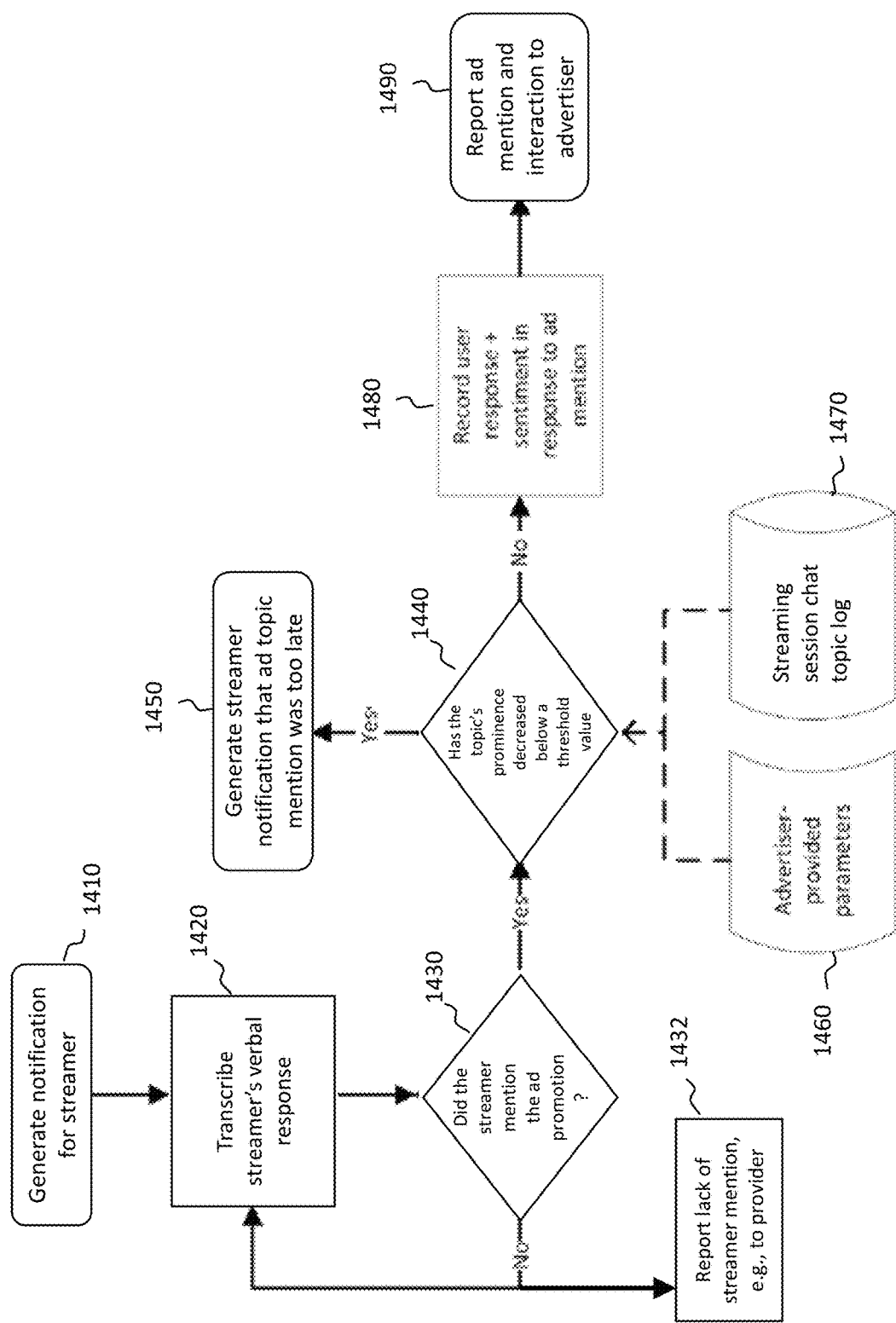
FIG. 14 is a flowchart of a process for reporting streaming session metrics and presenter performance to the provider of the supplemental content item, in accordance with some embodiments of the disclosure.

FIG. 14 is a flowchart of a process for reporting streaming session metrics and presenter performance to the provider of the supplemental content item, in accordance with some embodiments of the disclosure.

The process 1400 may be implemented, in whole or in part, by systems or devices such as those shown in FIGS. 2-3. One or more actions of the process 1400 may be incorporated into or combined with one or more actions of any other process or embodiments described herein. The process 1400 may be saved to a memory or storage (e.g., any one of those depicted in FIGS. 2-3) as one or more instructions or routines that may be executed by a corresponding device or system to implement the process 1400.

In some embodiments, at block 1410, the control circuitry 200 and/or 228 may generate a notification for the streamer. As described herein, the notification may be a prompt that is dynamically populated with a script. The script may be verbally read by the streamer to the participants of the streaming session. In other embodiments, the notification may be in any one of the formats described in FIG. 12. The streamer may select when and how to use the provided notification and present it to the participants of the streaming session.

At block 1420, the control circuitry 200 and/or 228 may transcribe the streamer's verbal response. The control circuitry 200 and/or 228 may access the streamer's microphone and transcribe the presentation of the supplemental content item by the streamer. The transcribed document may be stored in a database.

At block 1430, the control circuitry 200 and/or 228 may determine whether the streamer mentioned the ad promotion, e.g., the supplemental content item, during the streaming session. As describer earlier, a prompt (or another format of presentation as depicted in FIG. 12) may be provided to the streamer for presenting to the participants. Once the prompt is provided, the control circuitry 200 and/or 228 may determine whether the streamer used the information provided in the prompt related to the supplemental content item and presented it to the participants. If the streamer presented the supplemental content item, then the control circuitry 200 and/or 228 may measure various presentation parameters associated with the streamer's presentation. Some of these presentation parameters may include streamer's tone, streamer's sentiment, accuracy of the presentation as it relates to the supplemental content item, if all or relevant features of the supplemental content item were described, and quality of the streamer's interaction with the participants (e.g., eye contact detected by camera of presenter's device based on the presenter's gaze, consistency with natural speech patterns).

If a determination is made, at block 1430, that the streamer did not mention the ad promotion, e.g., the supplemental content item or any key components of the supplemental content item, such as a discount code, then the streamer's lack of mention may be noted and reported at 1432, such as to a provider of the supplemental content item, to the streamer itself, or to a service or server that functions to manage the supplemental content item. The streamer's verbal presentation at the time when the supplemental content item, such as the ad promotion, was to be presented may also be transcribed, at block 1420.

If a determination is made, at block 1430, that the streamer mentioned the ad promotion, e.g., the supplemental content item, then the control circuitry 200 and/or 228 may determine, at block 1440, whether the topic's prominence value decreased below a threshold value, in other words, whether the topic of the conversation in the chat session still has a sufficiently high prominence value. As described earlier in the description related to FIG. 11, the control circuitry 200 and/or 228 may monitor the conversation in the streaming session to determine whether the topic for which the supplemental content item was to be presented is still the topic that is being discussed in the streaming session.

If a determination is made, at block 1440, by the control circuitry 200 and/or 228 that the topic's prominence value has not decreased below a threshold value ("no" at 1440), in other words, the topic is still having a sufficiently high prominence value, then the process may move to block 1480. At block 1480, the control circuitry 200 and/or 228 may record the user (participant) response and sentiment in response to the mention of the supplemental content item, e.g., an ad promotion, and report it at block 1490 to the supplemental content item provider, streamer, and/or another authorized party that may receive such data. The control circuitry 200 and/or 228 may also determine whether the parameters provided by the supplemental content item provider, such as an advertiser, were considered by the streamer while presenting the supplemental content item.

If a determination is made, at block 1440, that the current topic being discussed in the streaming session, i.e., via chat messages, is not the same topic for which the supplemental content item was identified to be presented ("Yes" at 1440), then the control circuitry 200 and/or 228, at block 1450, may generate a late notification. The late notification may inform the streamer that the supplemental content item, e.g., the ad topic, was mentioned too late and that the conversation has moved on to another topic. Although reference to an ad and advertiser have been made in FIG. 14, the embodiments are not so limited, and any type of supplemental content item and supplemental content item provider is contemplated within the embodiments.

In some embodiments, a timer (such as timer 940 in FIG. 9) may be displayed on the streamer's UI. The timer may be set to a predetermined time, such as 10 seconds, within which the streamer is to present the supplemental content item to the participants of the streaming session. There may be instances where a topic achieves a high prominence score but is not subsequently mentioned again. In that case, a topic may no longer be relevant to the group chat despite its prominence value still being above a threshold. The timer may be used to ensure that the topic and associated supplemental content item are still relevant to the group chat.

It will be apparent to those of ordinary skill in the art that methods involved in the above-described embodiments may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. It should also be noted that the systems and/or methods described above may also apply to audio and video engagement by participants during the live streaming session and are not limited to chat messages.

What is claimed is:

1. A method comprising:
    establishing a live streaming session between a presenter device and a plurality of participant devices, wherein the presenter device is used to provide content for streaming live to the plurality of participant devices;
    receiving, within the live streaming session, a first chat message from a participant device of the plurality of participant devices;
    determining that a prominence value associated with the first chat message exceeds a threshold value;
    based at least in part on the prominence value exceeding the threshold value, determining that a supplemental content item, of a plurality of supplemental content items, is relevant to the first chat message; and
    automatically generating for display, a first prompt on a user interface of the presenter device for presenting the supplemental content item within the live streaming session, at a time before the supplemental content item is no longer relevant to a topic of the first chat message.

2. The method of claim 1, further comprising calculating the prominence value for the first chat message, wherein the calculation comprises:
   determining relevance of the first chat message based on a plurality of factors; and
   associating the prominence value with the received first chat message based on its relevance to one or more factors of the plurality of factors.

3. The method of claim 1, wherein determining that the supplemental content item is relevant to the first chat message comprises:
   analyzing the first chat message to determine one or more topics associated with the first chat message; and
   determining a match between the one or more determined topics associated with the first chat message and one or more topics associated with the supplemental content item.

4. The method of claim 1, wherein the first prompt provides text that corresponds to verbal content that is to be provided by the presenter device during the live streaming session.

5. The method of claim 1, wherein presenting the supplemental content item comprises selecting any one or more of:
   a display option for displaying the supplemental content item as a digital object within the live streaming session;
   a display option for displaying the supplemental content item by replacing an object in an environment associated with the presenter device; or
   a display option for displaying the supplemental content item as a ticker within the live streaming session.

6. The method of claim 1, further comprising:
   receiving, within the live streaming session, a second chat message from a second participant device of the plurality of participant devices;
   determining that a prominence value associated with the second message does not exceed the threshold value; and
   based at least in part on determining that the prominence value associated with the second chat message does not exceed the threshold value, not displaying a second prompt on the presenter device despite there being a match between a topic of the second chat message and a topic associated with a second supplemental content item.

7. The method of claim 1, further comprising:
   causing a removal of the displayed first prompt from the presenter device;
   receiving a second chat message from a second participant device on the streaming platform;
   causing a display of a second prompt for display on the presenter device, wherein the second prompt includes information for presenting a second supplemental content item that is related to the second chat message;
   receiving, after the second prompt is displayed on the presenter device, a third chat message from a third participant device on the streaming platform, wherein a topic associated with the third chat message is different from a topic associated with the second chat message;
   determining that the second supplemental content item identified in the second prompt has not been presented within the live streaming session prior to receiving the third chat message; and
   based at least in part on determining that the topic associated with the third chat message is different from the topic associated with the second chat message, and that the second supplemental content item that was identified in the second prompt has not been presented within the live streaming session prior to receiving the third chat message:
   causing a removal of the display of the second prompt from the presenter device.

8. The method of claim 1, further comprising:
   determining that the supplemental content item is not relevant to a second chat message received subsequent to the receiving of the first chat message; and
   based at least in part on determining that the supplemental content item is not relevant to the received second chat message, causing a removal of the displayed first prompt from the participant device.

9. The method of claim 1, further comprising:
   receiving one or more new chat messages; and
   updating the determined prominence value of a topic based on the received one or more new chat messages.

10. The method of claim 1, wherein automatically generating for display, the first prompt on the user interface, comprises generating for display the first prompt while the first chat message is still displayed within the streaming session.

11. A system comprising:
   communications circuitry configured to access a presenter device; and
   control circuitry configured to:
      establish a live streaming session between the presenter device and a plurality of participant devices, wherein the presenter device is used to provide content for streaming live to the plurality of participant devices;
      receive, within the live streaming session, a first chat message from a participant device of the plurality of participant devices;
      determine that a prominence value associated with the first chat message exceeds a threshold value;
      based at least in part on the prominence value exceeding the threshold value, determine that a supplemental content item, of a plurality of supplemental content items, is relevant to the first chat message; and
      automatically generate for display, a first prompt on a user interface of the presenter device for presenting the supplemental content item within the live streaming session, at a time before the supplemental content item is no longer relevant to a topic of the first chat message.

12. The system of claim 11, further comprising the control circuitry configured to calculate the prominence value for the first chat message, wherein the calculation comprises:
   determining relevance of the first chat message based on a plurality of factors; and
   associating the prominence value with the received first chat message based on its relevance to one or more factors of the plurality of factors.

13. The system of claim 11, wherein determining that the supplemental content item is relevant to the first chat message comprises the control circuitry configured to:
   analyze the first chat message to determine one or more topics associated with the first chat message; and
   determine a match between the one or more determined topics associated with the first chat message and one or more topics associated with the supplemental content item.

14. The system of claim 11, wherein the first prompt provides text that corresponds to verbal content that is to be provided by the presenter device during the live streaming session.

15. The system of claim 11, wherein presenting the supplemental content item comprises the control circuitry configured to select any one or more of:
- a display option for displaying the supplemental content item as a digital object within the live streaming session;
- a display option for displaying the supplemental content item by replacing an object in an environment associated with the presenter device; or
- a display option for displaying the supplemental content item as a ticker within the live streaming session.

16. The system of claim 11, further comprising the control circuitry configured to:
- receive, withing the live streaming session, a second chat message from a second participant device of the plurality of participant devices;
- determine that a prominence value associated with the second message does not exceed the threshold value; and
- based at least in part on determining that the prominence value associated with the second chat message does not exceed the threshold value, not display a second prompt on the presenter device despite there being a match between a topic of the second chat message and a topic associated with a second supplemental content item.

17. The system of claim 11, further comprising the control circuitry configured to:
- cause a removal of the displayed first prompt from the presenter device;
- receive a second chat message from a second participant device on the streaming platform;
- cause a display of a second prompt for display on the presenter device, wherein the second prompt includes information for presenting a second supplemental content item that is related to the second chat message;
- receive, after the second prompt is displayed on the presenter device, a third chat message from a third participant device on the streaming platform, wherein a topic associated with the third chat message is different from a topic associated with the second chat message;
- determine that the second supplemental content item identified in the second prompt has not been presented within the live streaming session prior to receiving the third chat message; and
- based at least in part on determining that the topic associated with the third chat message is different from the topic associated with the second chat message, and that the second supplemental content item that was identified in the second prompt has not been presented within the live streaming session prior to receiving the third chat message:
- cause a removal of the display of the second prompt from the presenter device.

18. The system of claim 11, further comprising the control circuitry configured to:
- determine that the supplemental content item is not relevant to a second chat message received subsequent to the receiving of the first chat message; and
- based at least in part on determining that the supplemental content item is not relevant to the received second chat message, cause a removal of the displayed first prompt from the participant device.

19. The system of claim 11, further comprising the control circuitry configured to:
- receive one or more new chat messages; and
- update the determined prominence value of a topic based on the received one or more new chat messages.

20. The system of claim 11, wherein automatically generating for display, the first prompt on the user interface, comprises the control circuitry configured to display the first prompt while the first chat message is still displayed within the streaming session.

* * * * *